(12) United States Patent
Simons et al.

(10) Patent No.: US 10,445,759 B2
(45) Date of Patent: Oct. 15, 2019

(54) SYSTEM AND METHOD FOR A LOYALTY NETWORK

(71) Applicant: Points.com Inc., Toronto (CA)

(72) Inventors: Dave Simons, Toronto (CA); Peter Lockhard, Toronto (CA); Chris Barnard, Toronto (CA); Peter Doulas, Toronto (CA); Daniel Shapiro, Thornhill (CA); Geoff Kent, Whitby (CA)

(73) Assignee: Points.com Inc., Toronto (CA)

( * ) Notice: Subject to any disclaimer, the term of this patent is extended or adjusted under 35 U.S.C. 154(b) by 470 days.

(21) Appl. No.: 14/869,068

(22) Filed: Sep. 29, 2015

(65) Prior Publication Data

US 2016/0092904 A1 Mar. 31, 2016

Related U.S. Application Data

(60) Provisional application No. 62/057,682, filed on Sep. 30, 2014.

(51) Int. Cl.
*G06Q 30/02* (2012.01)
(52) U.S. Cl.
CPC .............................. *G06Q 30/0226* (2013.01)
(58) Field of Classification Search
CPC ................................................. G06Q 30/0226
USPC .................. 705/14.28, 14.27, 14.58; 463/16; 715/700
See application file for complete search history.

(56) References Cited

U.S. PATENT DOCUMENTS

2002/0059103 A1 5/2002 Anderson et al.
2002/0143614 A1* 10/2002 MacLean ............... G06Q 30/02
705/14.28

(Continued)

FOREIGN PATENT DOCUMENTS

KR 20010035256 A * 5/2001

OTHER PUBLICATIONS

Peter Alexander, Use Data to Build Customer Loyalty, 2007 (Year: 2007).*

(Continued)

*Primary Examiner* — Tarek Elchanti
(74) *Attorney, Agent, or Firm* — Brett J. Slaney; Blake, Cassels & Graydon LLP

(57) ABSTRACT

In one aspect, there is provided a computer-implemented loyalty commerce network for facilitating generation of an application via an application computing device for communicating with loyalty programs via corresponding loyalty program computing devices, the network comprising: an application programming interface for receiving a request for generating said application and for generating said application based on said request and pre-defined templates associated with at least one of said loyalty programs; a loyalty program interface configured for communicating between the loyalty commerce network and said at least one loyalty program, said loyalty program interface for redirecting said request to said loyalty program; said loyalty program interface for defining a plurality of pre-defined criteria for validating said application; and, a loyalty server processor for processing said request and for validating said application in dependence upon said criteria being met.

18 Claims, 17 Drawing Sheets

(56) References Cited

U.S. PATENT DOCUMENTS

| | | | | |
|---|---|---|---|---|
| 2007/0174767 | A1* | 7/2007 | Shin | G06F 9/451 |
| | | | | 715/700 |
| 2008/0097850 | A1 | 4/2008 | Kristal et al. | |
| 2011/0313837 | A1 | 12/2011 | Katz et al. | |
| 2012/0214568 | A1* | 8/2012 | Herrmann | H04L 67/22 |
| | | | | 463/16 |
| 2014/0040030 | A1* | 2/2014 | Winters | G06Q 30/0261 |
| | | | | 705/14.58 |
| 2014/0257958 | A1* | 9/2014 | Andrews | G06Q 30/0226 |
| | | | | 705/14.27 |

OTHER PUBLICATIONS

"Appcelerator Helps AppGage Revolutionize Mobile Loyalty Programs"; thinkmobile.appcelerator.com; Jan. 7, 2013.
"Case Study: New Product Development—Rapid Development of a Loyalty Management System"; Aspire Systems; available online at least as early as May 28, 2013.

* cited by examiner

100

SYSTEM AND METHOD FOR A LOYALTY NETWORK

CROSS-REFERENCE TO RELATED APPLICATION

The present application claims priority to U.S. Provisional Application No. 62/057,682, filed on Sep. 30, 2014 and titled "System and Method for A Loyalty Network", the entire contents of which are incorporated herein by reference.

FIELD OF INVENTION

The present invention relates to facilitating development and maintenance of applications that enable loyalty commerce transactions and access loyalty program data within a loyalty based network.

BACKGROUND

Loyalty programs are organized to encourage and reward loyal buying behavior. Traditionally, a plastic or paper card, visually similar to a credit card or debit card, such as a loyalty card, rewards card, points card, advantage card, or club card, is used to identify the card holder as a member in a loyalty program. Once the loyalty member's identity is confirmed, a discount on the current purchase or an allotment of points for future purchases is granted.

Currently, the payment space is being transformed, becoming online-accessible. The consumer purchase experience is becoming more efficient with increased capabilities due to the use of mobile devices; for example, mobile phone users are now able to accept credit cards. Furthermore, in the loyalty industry there has also been a move away from traditional card-based schemes to online and mobile loyalty programs. While the traditional schemes vary, the common element is a push toward eradication of a traditional card, in favour of an electronic equivalent.

There exists a need to allow design and generation of applications by third party developers for use by consumers in accessing loyalty programs and managing rewards. There also exists a need for allowing customization of the user interfaces for generation of the loyalty applications.

SUMMARY OF INVENTION

In accordance with one aspect, there is provided: A computer-implemented loyalty commerce network for facilitating generation of an application via an application computing device for communicating with loyalty programs via corresponding loyalty program computing devices, the network comprising: an application programming interface coupled to the application computing device for receiving a request for generating said application and for generating said application based on said request and pre-defined templates associated with at least one of said loyalty programs, said application for communicating with at least one said loyalty program upon validation; a loyalty program interface configured for communicating between the loyalty commerce network and said at least one loyalty program, said loyalty program interface for receiving and redirecting said request to said loyalty program; said loyalty program interface for defining a plurality of pre-defined criteria for validating said application; and, a loyalty server processor for processing said request and for communicating with said loyalty program interface for determining said pre-defined criteria and for validating said application in dependence upon said criteria being met.

BRIEF DESCRIPTION OF DRAWINGS

Embodiments will now be described by way of example only with reference to the appended drawings wherein.

DETAILED DESCRIPTION

Figure 1A:
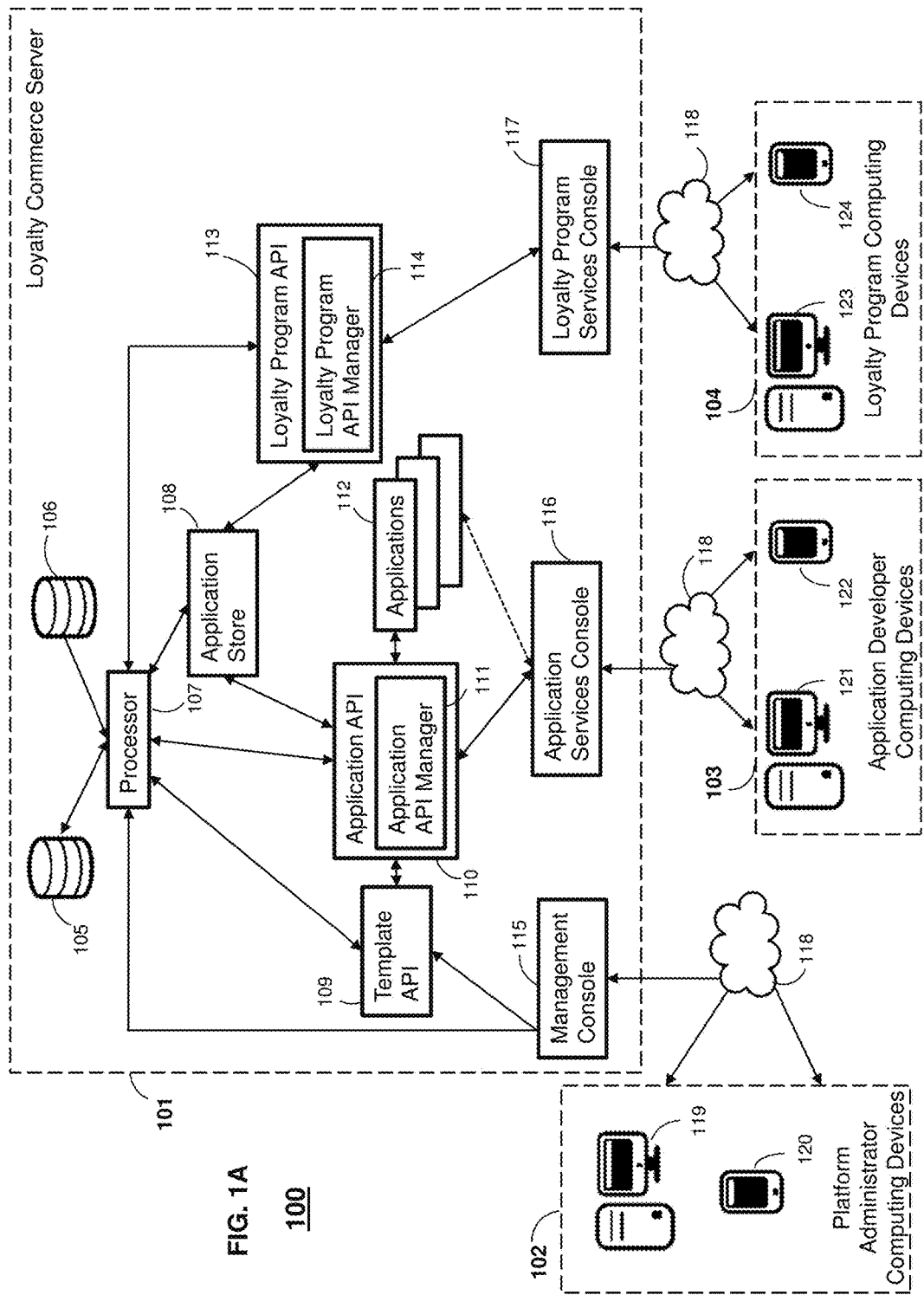
FIG. 1A illustrates the central infrastructure of the loyalty commerce network.

Numerals are used for convenience while referring to structures in the diagram. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

In accordance with one aspect of the present invention, there is provided a "loyalty commerce network" (LCN), supported by a central "loyalty commerce server" (LCS). Although a single loyalty commerce server has been discussed, a plurality of loyalty commerce servers can be envisaged. In one aspect, the loyalty commerce network is a collection of loyalty commerce servers hosted in an Internet accessible data center which is used to create the LCN shared environment hosted by the server. In one aspect, the term "network" encompasses a plurality of user computing devices that provide server access to the network users. In one aspect, the loyalty commerce servers represent the core processing functionality of the network, and permit communication and information transfer between network users, such as network administrators, via respective computing devices.

In one aspect, the loyalty commerce network facilitates interactions between application developers and loyalty programs. Both the application developers and loyalty programs can communicate via respective computing devices that interact with the network via application programming interfaces. Certain network users, such as application developers, are provided pre-defined developer rights to aspects of the loyalty commerce server in order to create loyalty-based applications, which interface with the server. As application developers complete new applications, the applications are submitted to the loyalty commerce server for approval. Upon dynamic or user-assisted (e.g. administrative) approval (approval with considerations of pre-defined rules), the application is made available in a virtual storefront to other network users, specifically to loyalty programs. As an example, the virtual storefront is a webpage with hyperlinks to approved applications, and hosted by the loyalty commerce server. A loyalty program, or any other party that participates in the LCN can immediately access the approved applications and make them available to their users (e.g. program membership or consumers).

In a further example, the generated application is published to at least one webpage for access and further modification by the corresponding loyalty program computing devices. Furthermore, the applications are configured to access the network data and perform loyalty based transactions in association with the loyalty program.

For example, using a sandbox, a developer can generate and edit an application. In sandbox mode, the developer can generate multiple credentials for himself or herself, or others. When the application is sufficiently developed, the developer submits the application to the loyalty commerce server for approval, along with metadata. The metadata includes objectives that the generated application aims to fulfill or does fulfill. For example, one objective may be to connect people to each other via data relationships, another objective may be to increase revenue, and another objective may be to encourage charitable donations. The application is published after it is validated by the loyalty commerce server. When the application is published, it is made available on an online market place or Internet accessible application store, so that others may use the application. Furthermore, the loyalty commerce server generates and issues a set of credentials for the developer. In an example embodiment, only one set of credentials is provided to the developer for the live mode application (also called the published application). In another example, multiple credentials are provided. The one set of credentials (or multiple set of credentials) are saved in a configuration file that is associated with the published application.

In an example embodiment, to modify the application, a developer uses their developer loyalty program computing device to access the application in a sandbox mode to create a new version of the application. The modified application is submitted to the loyalty commerce server for validation, and after being validated, the modified application is republished on the online market place or Internet accessible application store. In a non-limiting example embodiment, a new set of credentials are provided to the developer loyalty program computing device in association with the modified application.

In an example embodiment, the application is validated by the loyalty commerce server or a loyalty program computing device, or both. For example, the loyalty program computing device accesses the loyalty program interface to validate the application. A loyalty program computing device may use the loyalty program interface to view prototypes, screenshots and evaluate test transactions prior to going live.

In another aspect of validating the application, the objectives of a loyalty program, which are provided by the loyalty program computing device, are compared against the metadata of an application to be validated. As noted above, the metadata of the application to be validated includes objectives. In general, the loyalty commerce server of the loyalty program computing device, or both, match an application with one or more loyalty programs. If a given application's objectives align or match one or more objectives of one or more loyalty programs, then the application is validated. If the objectives do not substantially match, then the application may not be validated. The objectives may be predetermined and represented by alphanumeric codes or numeric values, so that a matching algorithm may employ optimization techniques to compare the desired objectives of loyalty programs with the objectives of the given application. In another example, fuzzy logic may be used to compare the desired objectives of loyalty programs with the objectives of the given application. In this way, an application may be autonomously validated. In another example, some user input is provided and the application is semi-autonomously validated.

A feature of the loyalty commerce server is the use of application programming interfaces (APIs), which allow application developers to develop loyalty applications associated with loyalty programs. These developed applications, once approved (e.g. by the loyalty commerce server) can then connect to the network, and extract and manipulate loyalty member data. Additionally, another feature is a unique set of APIs for loyalty programs which allow them to select applications with whom to partner and share loyalty member data.

Referring to FIG. 1A, there is shown a system, generally indicated by reference number 100. The system 100 is configured for allowing the development and/or modification of loyalty-based applications 112 (e.g. associated with loyalty programs). The system 100 has also been referred to as the loyalty commerce network (LCN) herein. In one embodiment, the system 100 is a network for facilitating loyalty transactions between dealers and consumers. As illustrated in FIG. 1A, the server 101 comprises self-service tools and automated processes to optimize resources. The loyalty applications 112 can be generated by external developers and/or administrators via one or more application programming interfaces (APIs) (e.g. application API 110, template API 109) provided on a centralized platform (also referred to as the loyalty commerce server 101). The loyalty commerce server 101 thus is able to communicate with external computing devices (e.g. 102, 103) for generating and/or modifying loyalty based applications. The loyalty commerce server 101 further communicates with each loyalty program via loyalty program computing devices 104 for allowing access to the applications 112 and/or providing information specific to the loyalty programs to the server 101 (e.g. for use in generating the applications).

Referring to FIG. 1A, the loyalty commerce network 100 comprises a centralized platform (e.g. loyalty commerce server 101) that communicates with a number of loyalty programs/partners (via loyalty program computing devices 104) and allows communication between the loyalty programs/partners (including transfer of information between parties).

Referring again to FIG. 1A, the loyalty commerce network 100 further comprises application programming interfaces (APIs) (e.g. application API 110) on the loyalty commerce server 101 that allows users to connect with the platform (e.g. loyalty commerce server 101) to generate (via a GUI associated with the particular API) a loyalty based application (e.g. 112). The loyalty based application 112 can be stored on the server 101 (e.g. on an application store 108) or on an external database in association with the server 101 for subsequent access by the loyalty program computing devices. The self-service API can be accessed via a GUI & CLI.

In a further aspect, the APIs further comprises a loyalty program API 113 configured to communicate with one or more loyalty programs via loyalty program computing devices 104. The loyalty program API 113 can be used to access the loyalty commerce server 101 (e.g. for accessing loyalty specific applications on application store 108 and/or leveraging loyalty based information provided from other loyalty programs and/or integrating applications or information with other loyalty programs). In one aspect, the loyalty program API can be used to approve loyalty applications 112 generated by computing devices 103 or provide pre-defined loyalty information specific (e.g. as loaded onto the templates API 109) for providing to the computing devices for generating the applications 112 according to the pre-defined loyalty information.

In yet a further aspect, the loyalty commerce network 100 is further configured for utilizing loyalty-based information associated with and communicated via the loyalty commerce server 101 (e.g. information passed between the loyalty program computing devices 104 and the loyalty commerce server 101) to determine loyalty program trends and/or target loyalty members (e.g. subscribed to a loyalty program) for various messages/actions based on their interaction with a particular loyalty program and/or loyalty commerce server 101. In one aspect, all communications between the loyalty program partners (e.g. computing devices 104) passes through a centralized platform, that is, the loyalty commerce server 101 (e.g. via the loyalty program API 113). Accordingly, in one embodiment, the loyalty commerce server 101 is configured for extracting and utilizing the loyalty data and performing predictive analytics for determining trends in the loyalty programs and extracting other classifying information.

Referring again to FIG. 1A, the loyalty commerce network 100 comprises the loyalty commerce server (LCS) 101 and user computing devices: platform administrator 102, application developer 103, and loyalty program computing devices 104. The loyalty commerce server 101 is accessed by the computing devices 102, 103, and 104 via a shared data exchange network 118 (e.g. Internet). The network 118 is also referred to as Internet 118 herein; however, numeral 118 can also represent for example a LAN, WLAN, WAN, MAN or other types of networks for communicating between a computing device and a server. The computing devices can include personal computers (119,121,123) and/or handheld computing device and/or mobile devices (120, 122,124).

The server 101 further comprises storage or databases 105 and 106, a processor 107, the application store 108, applications 112, a plurality of application programming interfaces (APIs 109, 110, 111), and network user consoles (115, 116, 117). The processor 107 is further configured for carrying out network operations and allowing communication with the computing devices 103 and 104 for configuration and/or modification of applications and/or communication with loyalty program partners.

New applications 112 are built using APIs, such as the application API 109, and the template API 109. To streamline development procedures, pre-defined templates can be accessed by via a template API 109. A template can be setup by administrators (e.g. via computing device 102) and/or provided by a respective loyalty partner via computing device 104. In one aspect, the template API 109 is configured to store pre-defined criteria (e.g. a set of computer executable instructions) associated with each loyalty program for approving or rejecting a proposed application as submitted from application developer computing devices 103. As will be described, the applications 112, once generated are configured to interact with the application API 110 in order to access and perform loyalty based operations via the network 100. As will be defined the applications 112 are configured for allowing users subscribed to a particular loyalty program to interact with loyalty based accounts (e.g. through querying balances, or by debiting, crediting, and/or trading rewards).

In one aspect, it is noted that while application functionality will vary, it is expected that there are some commonalities between applications associated with different loyalty programs. For example, applications would perform the following operations: conduct a member validation (verifying that a member exists and is a valid member of the loyalty program) and at least one the following operations: a) deposit of points/miles into a member's account or b) a withdrawal of points/miles from a member's account. Such functionalities are pre-loaded onto the templates API 109, in accordance with one aspect.

Accordingly, the template API 109 reduces the need for application developers to have expertise in implementing standard features required for connecting to the server 101 and/or facilitates the development of application 112 by providing pre-defined templates for the applications according to information provided by the respective loyalty partners. The pre-defined template information can include: visual attributes defined for an application associated with a particular loyalty program, pre-defined rights for users of loyalty programs in interacting with the application (e.g. querying balance, updating member profile information, debiting or crediting loyalty member accounts, trading loyalty rewards between loyalty programs, etc.).

The loyalty program API 110 allows loyalty programs to access and relay user inputs (from the computing devices 104) to the server 101. As will be further described, the loyalty program API 110 is configured to, for example, receive application requests (e.g. from third party developers via computing device 103) and provide responses thereto; in an example situation, the loyalty program API may be used to validate member credentials (e.g. as received from loyalty program computing device 104).

Network users access the APIs 109, 110, 111 to communicate with the server 101 via designated network user consoles (e.g. 115, 116, and 117).

Network user consoles include a management console 115, an application services console 116, and a loyalty program services console 117. In one aspect, the consoles (115, 116, and 117) represent gateways accessed by computing devices (102, 103, 104) via the Internet 118 for accessing the provided functionalities of the network 100 and server 101, achieved by the processor 107. As will be described below, in one aspect, the consoles comprise web applications provided by the server 101 and accessible by the respective computing for allowing management of user accounts and credentials, web-hooks, etc. In one aspect, the application services console 116 allows application submissions to the application store 108 and accessing reports related to the applications 112. In another aspect, the console captures credentials of the application developer and allows them to manage a respective application via the console. In another aspect, the management console 115 is provided to allow users of computing devices 102 to review applications submitted by computing device 103 (e.g. proposed applications for approval provided to the application store 108) prior to the applications 112 being visible to subscribers associated with a particular loyalty program. In one aspect, consoles are accessed by entering any provided credentials, and provide network tools according to the type of network user. In another aspect, consoles are accessed by computing devices 102, 103, and 104 for providing information regarding application transactions.

Figure 13:
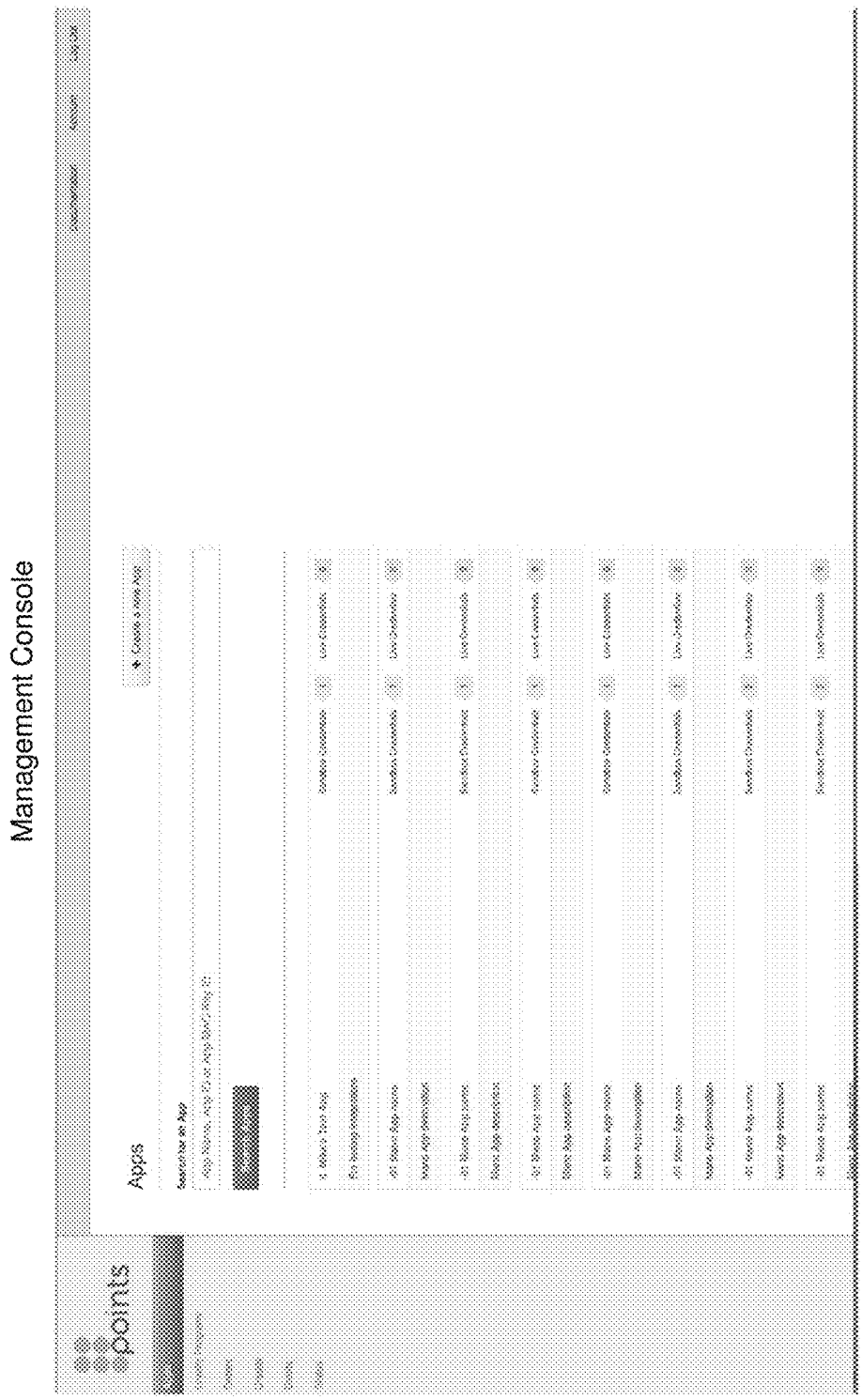
FIG. 13-15 illustrate exemplary screen shots of a management console for use with the loyalty commerce network of FIG. 1A in accordance with one embodiment.
Figure 14:
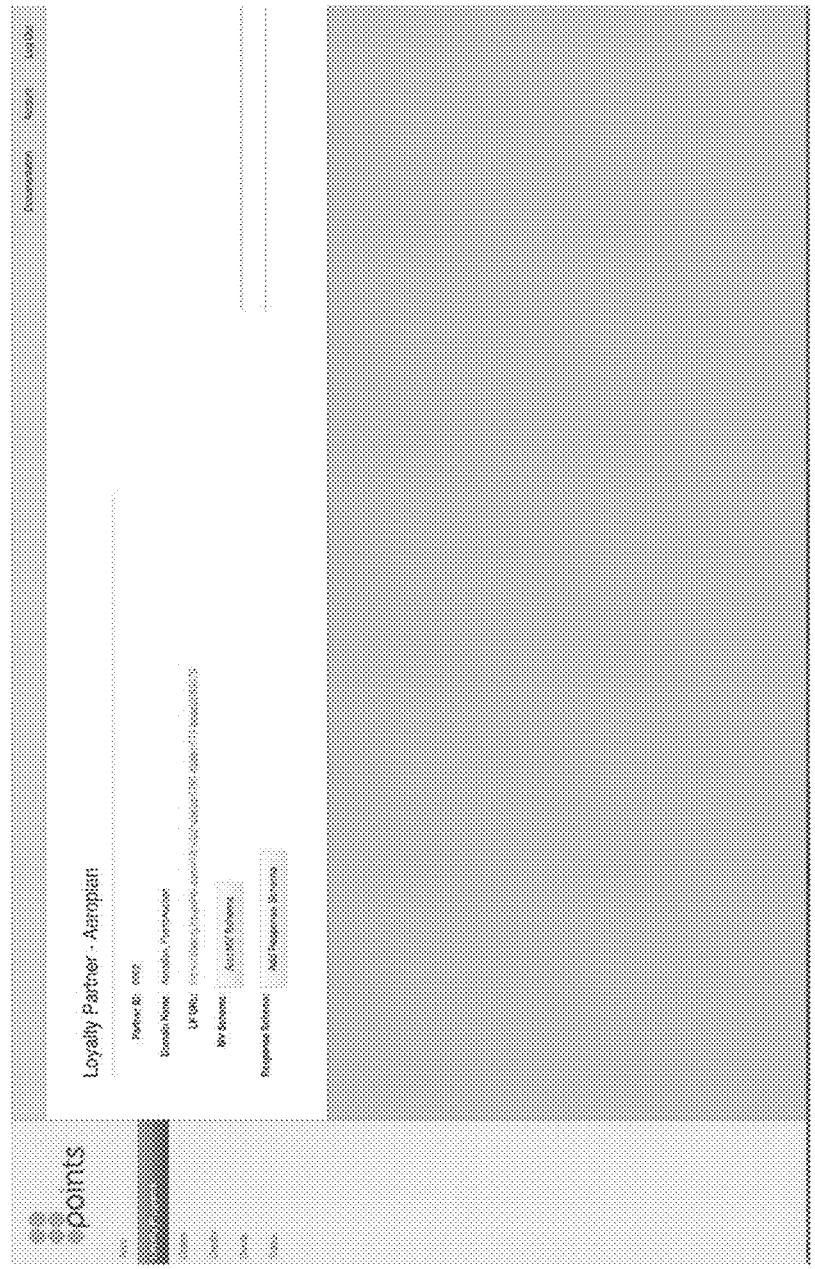
Figure 15:

FIG. 13-15 illustrate exemplary screen shots of a management console for use with the loyalty commerce network of FIG. 1A in accordance with one embodiment.

Referring again to FIG. 1B, an alternate example configuration of the loyalty commerce server 101 is shown, which further demonstrates the interactions between exemplary components within the server 101. Similar to FIG. 1A, one aspect of the server includes user consoles, such as the application services console 116, the management console 115, and the loyalty program console 117. Each console is a gateway allowing users to interact with the application API 110, the template API 109, and the loyalty program API 113, respectively. The application API 110, the loyalty program API 113 and the template API 109 communicate with the processor 107; said APIs are communication tools to relay requests from users to the processor 107 to be authenticated and executed. In one aspect, the processor 107 of the server 101, refers to a decision-making criteria database 106 to execute loyalty based approvals (e.g. of applications) without requiring manual input. Alternatively, it should be understood that the management console 115 is also capable of facilitating the actions of the processor 107, through use of the template API 109.

Combined use of the application services console and the application API allows third-party application developer to build an application 112B or a plurality of applications 112 to interact with the application API 110. Similarly, loyalty programs access the loyalty program services console 117 and the loyalty program API to integrate the loyalty programs' member data into the loyalty program member database 105. For the purposes of this diagram, it should be understood that loyalty programs 1 through "n" (125B) represent the collections of loyalty program data, each associated with a particular loyalty program or business.

Databases

An exemplary function of the server 101 is to provide access to loyalty program member data for each loyalty program; the data is stored in storage such as database 105. A second database 106 represents another collection of data, which includes one or more predefined criteria or logic data for evaluating and approving server operations. In one aspect, the logic data includes a set of criteria that, if met, causes the processor 107 to execute an event. The reverse is also true, where if criteria are not met, the event would not be executed. For example, if content is entered into a data-type and formatted as a time value, if the entry is greater than twenty-four hours, that entry will be disallowed.

It should be understood that both databases 105 and 106 represent collections of data that may be stored in multiple, independent storage locations. In the event of errors or malfunctions in one location, network traffic is automatically routed to another backup storage location. In an example emergency situation, DNS load balancing techniques are used to route application requests to the appropriate storage location data.

Processor

The processor 107 is configured for executing a set of computer executable instructions for performing services provided by the server 101, in particular network authentication and authorization operations. Specific tasks include for example, but not limited to: payment processing, fraud detection, policy enforcement, and pricing with respect to each loyalty program (e.g. via loyalty program computing devices 104) and/or generation of applications (e.g. via application developer computing devices 03). The processor 107 is also responsible for lower-level routing services, connecting eligible applications (e.g. as generated by application developer computing devices) to loyalty programs (e.g. via computing devices 104). In one aspect, the processor 107 is configured to access database 106 providing predefined criteria for approving a selected application according to previously defined criteria (e.g. pre-set by an administrator 102 or loyalty program 104). In one aspect, the criteria for approving an application is defined based on previously approved applications associated with a particular loyalty program and stored on the server 101 (e.g. databases 105, 106).

Application Store

The application store 108 represents a virtual storefront for accessing third-party applications 112. In an example embodiment, the virtual storefront includes one or more webpages that can be accessed by loyalty program computing devices 104 connected via the Internet 118. In one aspect, the web pages and/or website is associated with a web server (not shown) stored on the server 101 or in communication with the server 101. The application store 108 is a form of electronic marketing/interactive media for browsing and purchasing application products (e.g. as approved by administrator computing devices 102).

APIs

APIs, such as the template API 109, the application API 110 and the loyalty program API 113 are configured to orchestrate the interactions of the server 101 components, including software and/or hardware and to allow communication with external devices such as computing devices 102, 103 and 104. For example, one responsibility held by APIs 110 and 111 is to route requests for data and forward communications on the network 100. In other examples, the APIs also can perform member validation to authenticate a loyal program member's credentials before returning the account balance, credit actions to add loyalty points or rewards into a loyalty program member account, or debit actions to extract loyalty points or rewards from a loyalty program member account.

APIs are also used to facilitate the generation of programming graphical user interface components for third-party applications. In particular, the template API 109 includes a set of templates for creating GUIs that incorporate the visual look or graphical appearance or design of the interfaces for individual loyalty programs. In another example, the template API 109 also includes pre-developed and pre-tested features. The purpose of the pre-implemented functionality is to increase efficiency of application development and increase the resulting applications' reliability, benefiting application developers and loyalty programs alike. The template APIs 109 are managed by accessing the management console 115; for example, new GUI templates are uploaded from server administrator computing devices 102 upon request by loyalty programs.

In an example embodiment, APIs (109, 110, 113) are representational state transfer style (REST style or RESTful) web services that are able to access data from all the loyalty programs integrated into the loyalty commerce network 100. It should be understood that REST is an architectural design type that involves a coordinated set of constraints applied to components, connectors, and data elements, within a system. Furthermore, it is known that in one aspect, REST can ignore the details of component implementation and protocol syntax in order to work with the roles of components, the constraints upon interaction with other components, and the interpretation of significant data elements. Furthermore, in another example embodiment, the application API 110 includes RESTful resource primitives of a sufficient granularity for building the applications.

In an another aspect, as an example, an application API 110 utilizes HTTPs to secure interactions between server 101 components, and safeguard loyalty program member data 105 in a public, online environment.

In an example embodiment, requests from the APIs made to the LCS use HTTPS. API operations are governed by HTTP verbs (or commands) such as "post", "get", "put", or "delete" can send new resources to the network 100, retrieve resources from the network, update existing resources, or delete resources, respectively. Content in requests and responses to or from the processor 107 is the programming language JSON, encoded as UTF-8. Upon successfully completing a request, an "OK" message is returned via the GUI (e.g. the associated console) to the associated computing device with a representation of the altered data resource.

Referring again to FIG. 1A, applications 112 are built on the platform (e.g. server 101) using the application API 110 (e.g. by access of computing devices 103). In one embodiment, the application API 110 provides access to a simple set of computer executable primitives or instructions than can be used to build or generate a variety of loyalty applications 112. In addition to interacting with the application API 110, the computing devices 103 also interact with the platform (e.g. server 101) using the application services console 116. In one aspect, a particular application interacts with the API and a developer uses the console to accomplish tasks like logging in to look up transaction history. One purpose of the console 116 is to allow the application developer (e.g. computing devices 103) to manage account participation in the network 100, such as to enable management of credentials, application submission to the application store 108 and access to reports.

In one embodiment, the loyalty programs plug into the network 100 and server 101 using the loyalty program API 113. The loyalty program API 113 is configured to allow loyalty programs (e.g. provided by loyalty program computing devices 104) to receive application requests, to validate member credentials, as well as add and remove points/miles from a member's account (e.g. a member subscribed to a particular loyalty program and associated with an application). In one aspect, referring to FIG. 1A, loyalty programs also interact with the platform using the loyalty program services console 117. The console 117 is configured to enable the loyalty programs associated with computing devices 104 to manage their participation in the network 100, by managing their credentials, registering web-hooks, browsing the loyalty program application store 108, to select previously registered applications and access reports.

API Manager

An API manager (111, 114) is a set of computer executable rules and/or inactive code for execution by the processor 107 and dedicated to mediating operations performed by the respective API (110, 113). In one aspect, the API managers 111, 114 wrap the functional aspects of associated APIs with non-functional attributes. Tasks performed by the API manager (111, 114) include but are not limited to: application authentication, mapping internal URLs to external formats, gathering analytics and usage data relating to applications traffic management (e.g. request throttling and rate limiting).

In an example situation, an API manager (111, 114) reviews requests to be routed through the API (110, 113), and limits the number of requests processed at one time. In other words, the manager 111 compares the number of operations performed by the processor 107 with a set limit, and queues the said task if the limit has been temporarily reached. This decreases the chances of overloading the processor 107 for optimal performance of the network 100.

Applications

Applications 112 provide features to loyalty program members that enable the members to interact with accounts; example account interactions include querying, crediting, and debiting loyalty balances. Applications 112 are implemented, hosted and operated by third-party application developers (e.g. via computing devices 103), and can be deployed as web applications or mobile applications (e.g. provided by application store 108).

The server 101 is configured to support the development of applications 112 by third party application developers (e.g. providing application requests via computing devices 103). The server 101 provides access to the development tools and required resources. Completed applications are able interact with APIs (110, 113) and API Managers (111, 114) to communicate with the processor 107, and access and alter loyalty member data 105.

User Consoles

Consoles (115, 116, and 117) exist as virtual gateways for accessing varying functionalities of the processor 107 upon connection to the server 101. In one embodiment, consoles are specially tailored for each type of server user, and are accessed by entering credentials. In one aspect, each console provides services, which include but are not limited to: the ability to oversee user accounts settings, manage permissions to access the network, and access reporting services. Although not shown in FIG. 1A, in an example embodiment, each console includes three distinct components, an API, a CLI (command line interface), and a graphical user interface (GUI). Each console can include one or more types of interfaces to be used for different purposes: for example, a CLI is used for developer purposes, and a GUI is used for managing user accounts. In an example embodiment, consoles utilise RESTful web services in order to support access by both computer and mobile devices, as shown in FIG. 1A, encapsulated by numerals 102, 103, and 104.

Figure 1B:
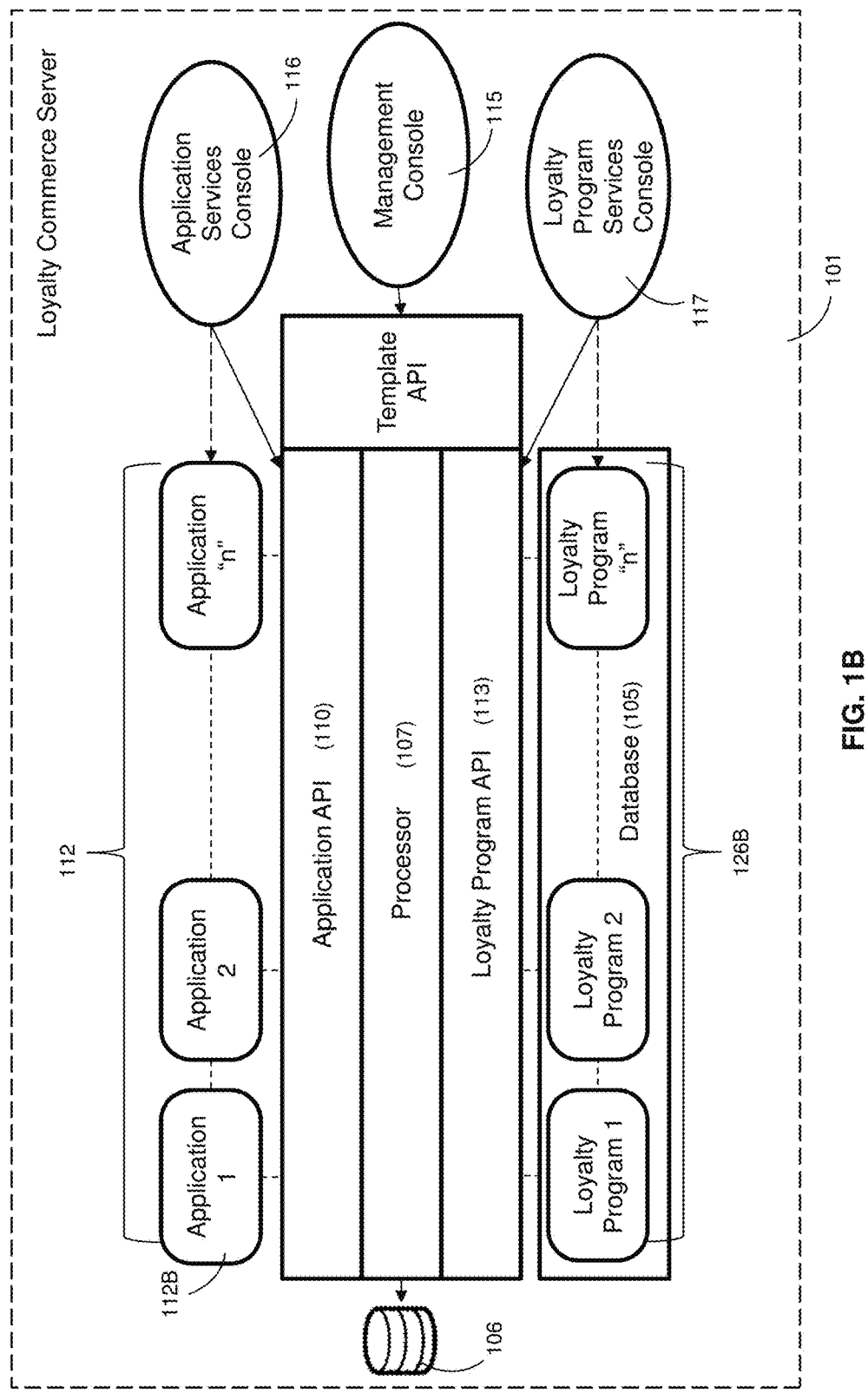
FIG. 1B illustrates an example of the communication between components in the loyalty commerce server.

FIGS. 1A and 1B both illustrate a management console 115 for accessing managerial server tools, an application services console 116 for developing and managing third-party applications, and a loyalty program services console 117 allowing loyalty programs to manage loyalty programs on the network 100.

For example, the loyalty program services console 117 is the access point to the LCN 100 for loyalty programs. In an example embodiment, the loyalty program console 117 includes a self-service component, allowing new loyalty programs to integrate data with the network 100 database 105. Furthermore, in another aspect, the console 117 enables user registration, management of users within an organization, management of credentials, and configuration of methods for applications to access loyalty program data. In an example embodiment, the loyalty partner console 117 is a web application.

In one embodiment, when an application 112 is generated by computing devices 103 and submitted to the server 101 for approval (e.g. to the application store 108), the application 112 is not immediately visible to loyalty partners (e.g. computing devices 104). That is, in one embodiment, an administrator accesses, via computing device 102, the application for review and approval. In another embodiment, the application API 110 is provided with pre-defined criteria 106 (e.g. pre-set by the loyalty programs) to automatically approve/deny applications 112 submitted to the application store 108 for approval. After an application 112 is approved, the application will be accessible on the application store 108.

Sandbox and Live Modes

Figure 2:
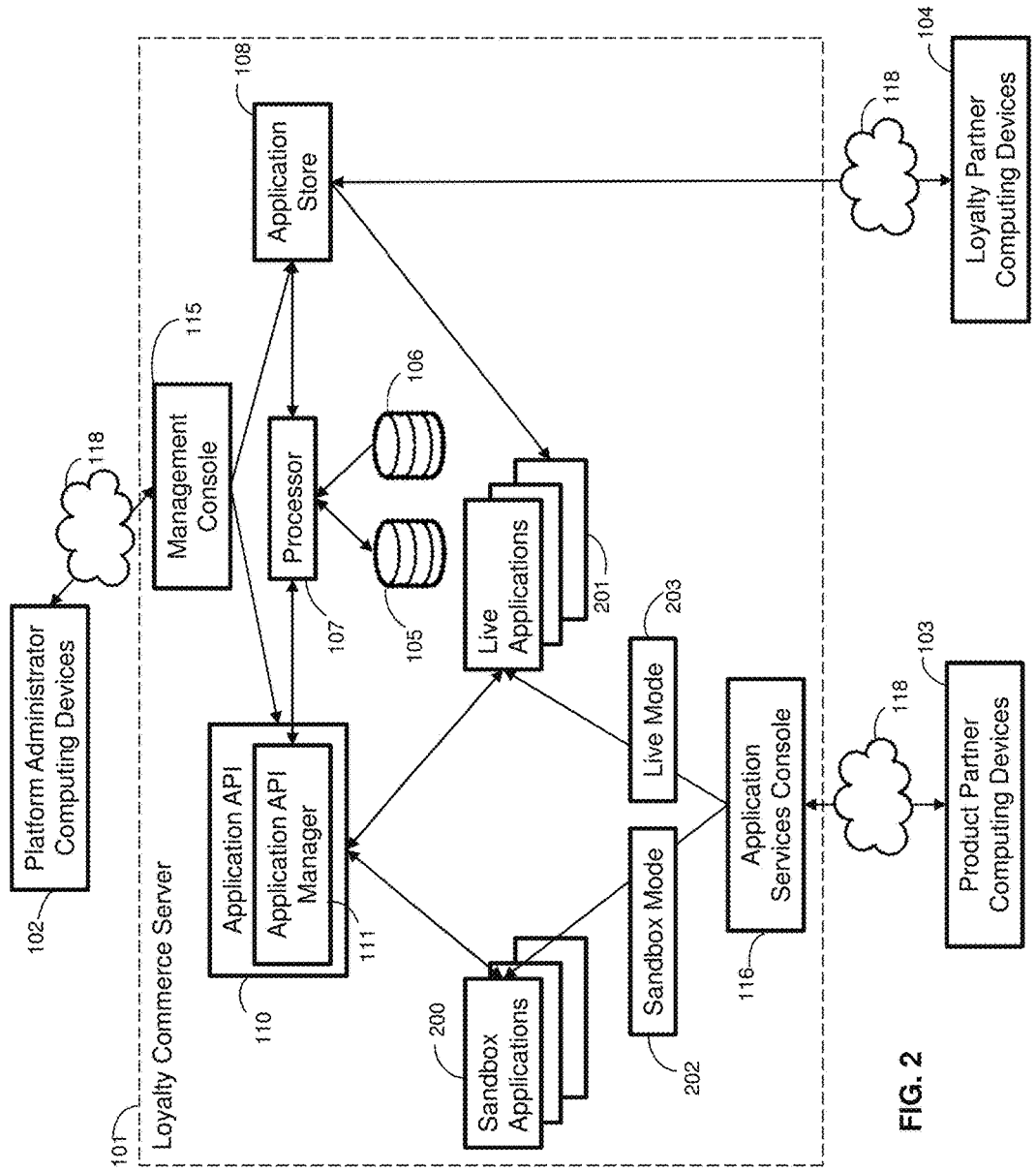
FIG. 2 depicts the components involved with creating and submitting an application for shared access on the network.

FIG. 2 shown is a schematic diagram of the network 100 depicting an application 112, from creation to live network status, in accordance with one embodiment. First, computing devices 103 access the Internet 118 to open the applications services console 116. The GUI presents the option to create new or "sandbox" applications 200, or review current or "live application" 201, and another passkey or security verification is entered. Based on the selected option, the application opens a sandbox mode 202 (developer environment) or a live mode 203 (managerial environment), accordingly. It should be understood that sandbox mode 202 provides access to development and testing tools; however, manipulations of the data contained within database 105 is restricted, in accordance with one embodiment. The sandbox application 201 is able to access the API 110 network operations, but the inactive, non-functional code of the API manager 111 simulates changes to loyalty member data rather than storing changes in database 105. In an example embodiment, to test application functionality that adds points to a loyalty member account balance, the application developer submits a "post" command (followed by a numerical amount of points to be added to the loyalty account) to the application API 110. The application API manager 111 checks that the type of the application, and, since the application is in sandbox mode 202, the API manager restricts the "post" operation from saving altered data to the database. The application 112 then receives feedback from the application API 110 regarding the success of the operation.

Upon completion of a sandbox application 200, a request is submitted to the processor 107 by means of the application API 110. In one aspect, pre-defined approval processes are used (e.g. according to pre-defined criteria and instructions) to update the application to live mode. In an example embodiment, approval procedures are performed with further input by administrative staff. Server administrator computing devices 102 and the management console 115 provide users access to view the sandbox application 200. Upon approval, the sandbox application 200 becomes a live application 201: said application 201 is transferred to a new, live URL. This URL is then made accessible by the application store 108 for loyalty programs to evaluate and possibly select the application for use by the loyalty programs' customers. The live application 201 continues to access the application API 110 and application API manager 111 to communicate with the processor 107 and to interact with data in database 105. Furthermore, live applications 201 are granted permissions to manipulate loyalty program member data, by adding and removing to loyalty points balances stored the database 105.

In an example embodiment, the loyalty commerce server 101 redirects a newly live application 201 to a new URL automatically. In another example embodiment, where the sandbox application 200 code references the sandbox mode URL, the code is updated manually to the live mode URL. In both cases, a live mode passkey is also entered to allow developer and managerial access to the live application 201.

Example Uses and Workflows

Figure 3:
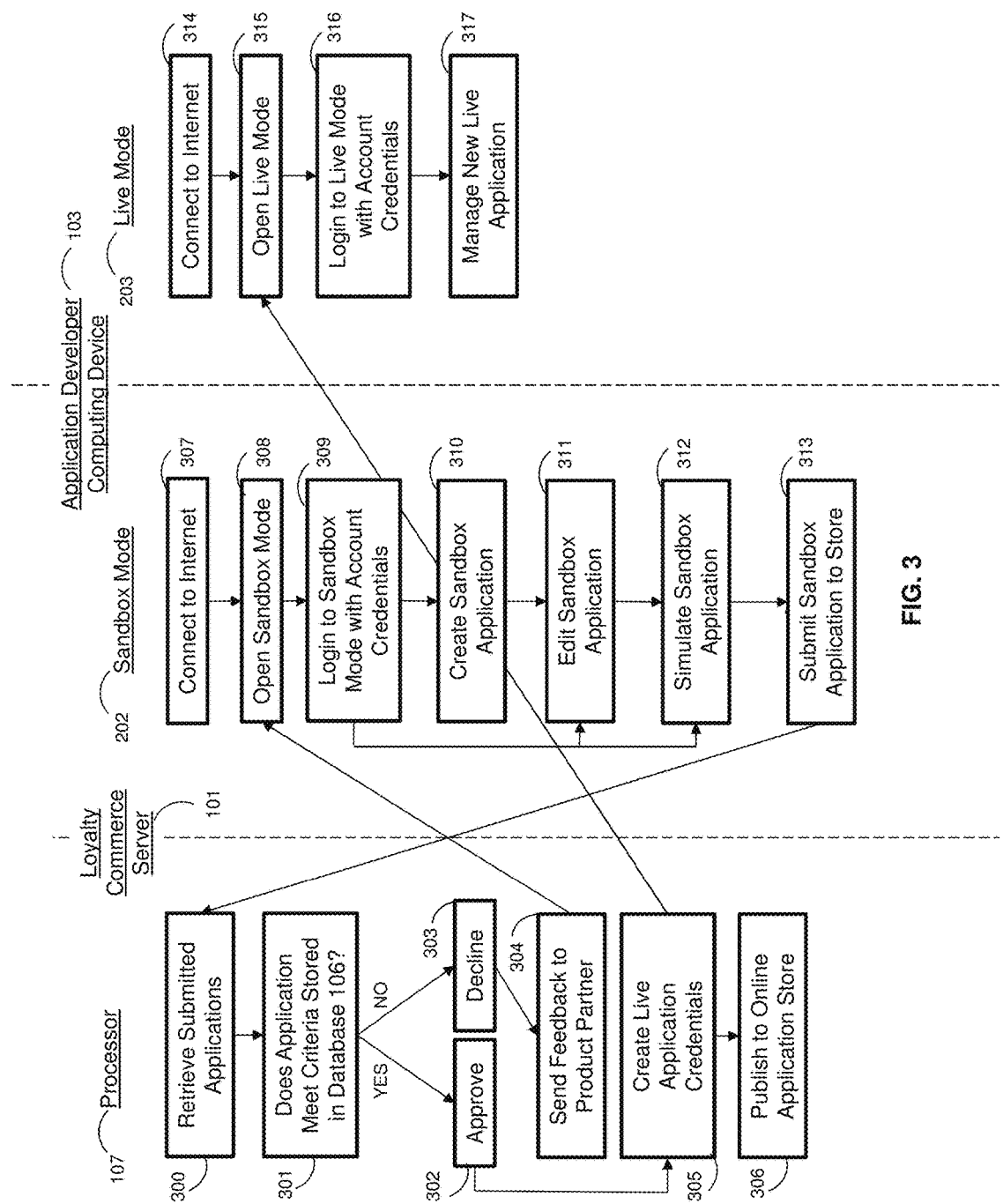
FIG. 3 presents an automated process for evaluating sandbox applications.

FIG. 3 presents a workflow diagram depicting the process for creating and approving an application, in accordance with an embodiment. FIG. 3 shows interactions between the application developer computing device 103, which accesses the application services console 116 (in sandbox 202 or live mode 203), and the processor 107. The leftmost column, under the heading processor 107, contains workflow steps 300 to 306. It should be understood that the processor 107 executes steps (e.g. 301-306) automatically based on computer executable instructions (e.g. pre-defined criteria and/or pre-defined templates and/or data associated with previously generated applications and/or pre-defined application data associated with a particular loyalty program). First, the processor 107 retrieves applications submitted for review 300. The processor 107 evaluates whether pre-defined criteria stored in database 106 have been met 301. If the criteria are met, the sandbox application 200 is automatically approved for live mode 203 in step 302. If criteria are not met, the sandbox application is denied access to live mode 303, and the response is sent to the application services console 116 in step 304. Upon approval, live application credentials are created at step 305. The credentials include a new URL and a developer password to access this URL. The URL is made public on the loyalty commerce network 100 by publishing the new URL on the application store 108 in step 306.

FIG. 3 also illustrates steps executed by application developer computing devices 103 to develop and submit new applications 112 to the server 101. First, the computing device 103 connects to the Internet 118 in step 307. In step 308, the computing device opens sandbox mode 202 of the application services console 116. Next, account login credentials are entered 309. Upon a successful login, the GUI presents developer options, which include creating a new application 310, editing an existing application 311, or simulate the use of an application 312. After finalizing an application, the application 112 can be submitted for review 313, and the request is sent to the server processor 107 at block 300.

If the application 112 is approved, once the computing device 103 is connected to the Internet 118 (step 314), live mode is opened in step 315. The account login credentials received from the server administrator computing device 102 are then entered in step 316. Live mode 203 provides managerial options for maintaining live applications in step 317.

Figure 4:
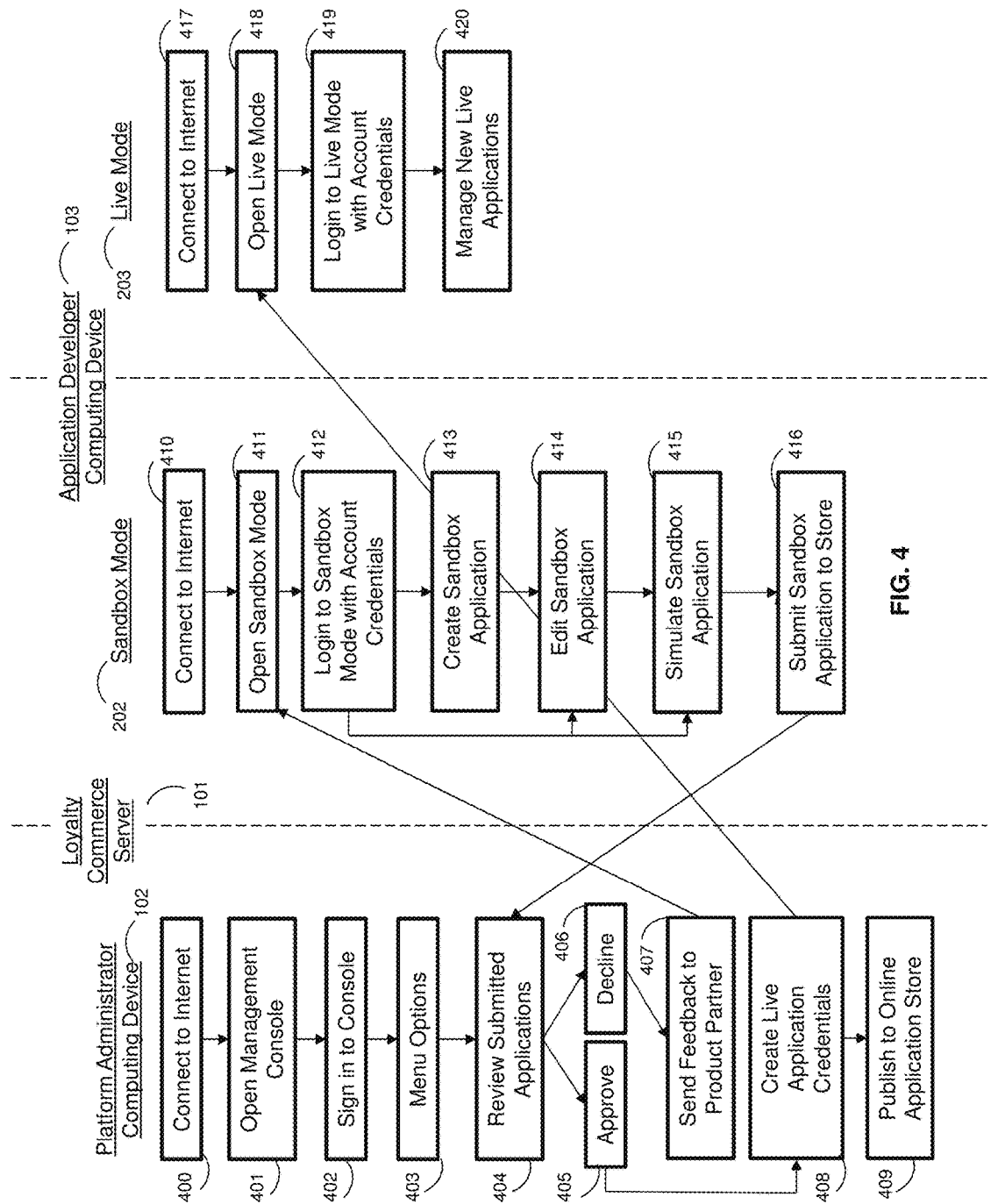
FIG. 4 presents a manual process for evaluating sandbox applications.

FIG. 4 presents an alternate detailed workflow diagram to FIG. 3, illustrating interactions between the application developer computing device 103 (using the application services console 116 in sandbox 202 and live mode 203) and a server administrator computing device 103, in accordance with an embodiment. Upon accessing the Internet 118 in step 400 and opening the management console 115 in step 401, the console accepts login information 402 to access the network 100.

It should be understood that, as an example embodiment, login information includes a URL and email address; the email address may be provided by the application developer upon account initiation, or assigned automatically by the processor or manually by the server administrator computing device. In another example embodiment, login information is also MAC token are provided by the application, which includes a passkey, a unique passkey identifier, and a reference to an algorithm. In one aspect, the MAC token provides enhanced security as the algorithm associated with a key is able to generate signatures. Signatures are sent across the shared server with any requests for identification purposes. Signatures are used in the place of the actual key, which could be intercepted and read by a malicious third-party user. Once the signature is received by the server, the server is able to reverse the generated signatures to determine the corresponding identifiers.

In step 403, the management console 115 displays options, one option being to manage the application store 108. This refers to managing the visibility of applications 112 with regard to other network 100 participants. The GUI provides the ability to review submitted sandbox applications 200 in step 404. If the application 200 does not meet pre-defined criteria and standards (these criteria can co-operate with pre-defined criteria previously defined by the server 101) as defined by the computing device 102, the application is declined 406 and feedback is sent to the application developer computing device via the application services console GUI 407 by means of the server 101. If the sandbox application 200 is approved 405, the sandbox application 200 will be given live application credentials 408, which are sent to the application developer. The now live application 201 is added to the application store, which is publicly available to the network 100, in block 409.

FIG. 4 also illustrates steps executed by application developer computing devices 103 to develop and submit new applications 200 to the server 101. First, the computing device 103 connects to the Internet 118 in step 410. In step 411, the computing device opens sandbox mode 202 of the application services console 116. Next, account login credentials are entered 412. Upon a successful login, the GUI presents developer options, which include creating a new application 413, editing an existing application 414, or simulate the use of an application for testing purposes 415. After finalizing the development of an application, the sandbox application 200 is submitted for review 416, and the request is sent to the server administrator computing device at block 404.

Once the application 112 is approved, and the computing device 103 is connected to the Internet 118 (step 417), live mode is opened in step 418. The account login credentials received from the server administrator computing device 102 are then entered in step 419. Live mode 203 provides managerial options for maintaining live applications in step 420.

Figure 5:
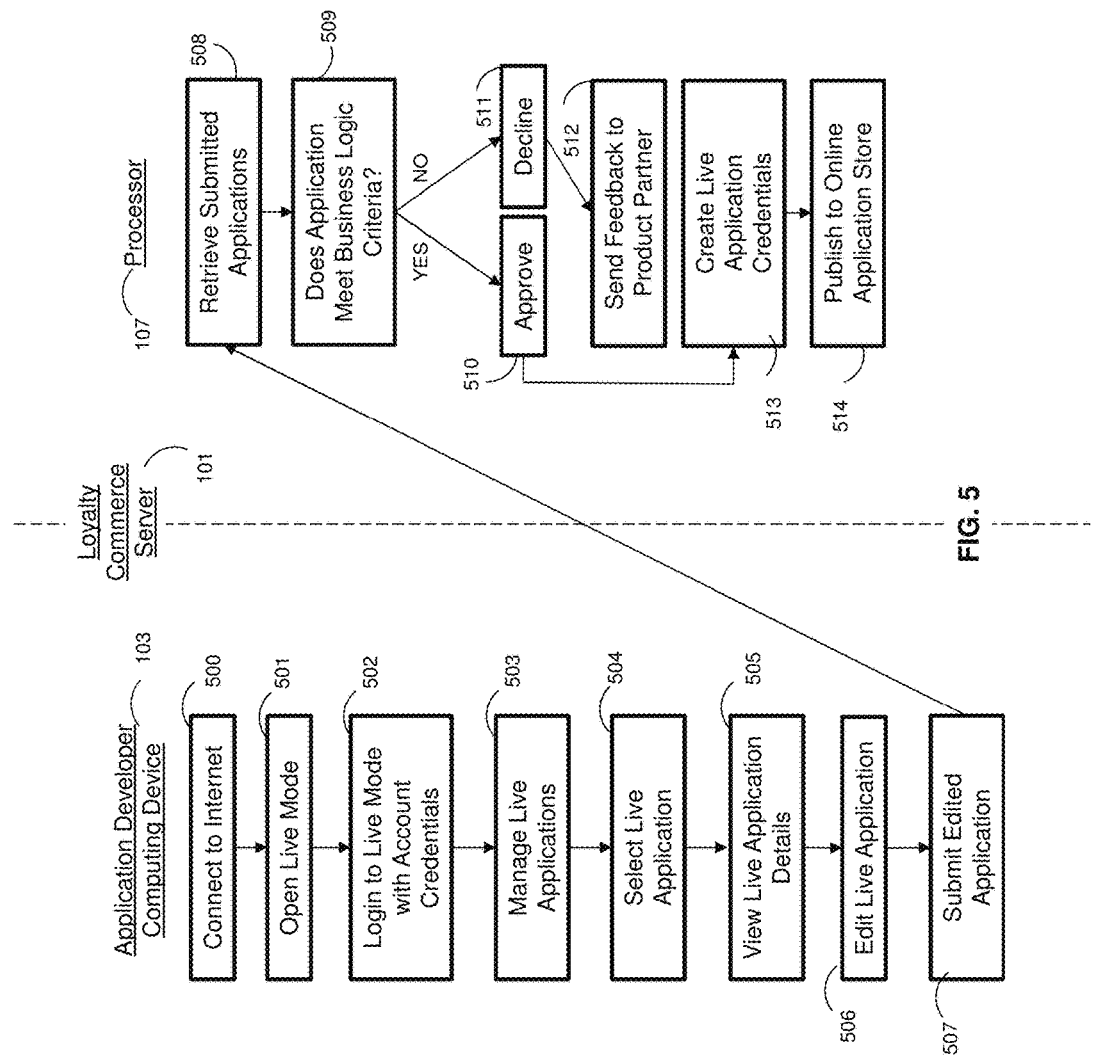
FIG. 5 illustrates a process for altering live applications.

FIG. 5 presents a detailed workflow diagram to show interactions between the application developer computing device 103 and the processor 107 to alter a live application 201, in accordance with one embodiment. The left column contains the workflow steps 500 to 507 as executed by the application developer computing device 103. First, the computing device 103 connects to the Internet 118 in step 500, and live mode is opened in step 501. Account login credentials are provided in step 502. The live mode 203 GUI provides managerial options for maintaining live applications in step 503. The GUI allows the selection of a specific application 504, shows details of the specific application 505, and provides tools to edit the live application as needed 506. Once changes are made, the edited application is sent the processor 107 for review in step 507 and validation (e.g. according to pre-defined criteria associated with the server 101 and/or the particular loyalty program 104).

The right column contains the workflow steps 508 to 514 as executed by the processor 107. It should be understood that the processor 107 executes steps automatically using computer executable instruction, and using criteria stored in database 106 as a resource. In step 508, the processor retrieves applications submitted for review. The processor 107 evaluates whether criteria stored in database 106 have been met 509. If the criteria are met, the sandbox application 200 is approved for live mode 203 in step 510. If criteria are not met, the sandbox application is denied access to live mode 511, and the response is sent to the application services console 116 in step 512. Upon approval, live application credentials are created 513; credentials include a new URL and a developer password to access this URL. The URL is made public on the loyalty commerce network 100 by publishing the new URL on the application store 514.

Figure 6:
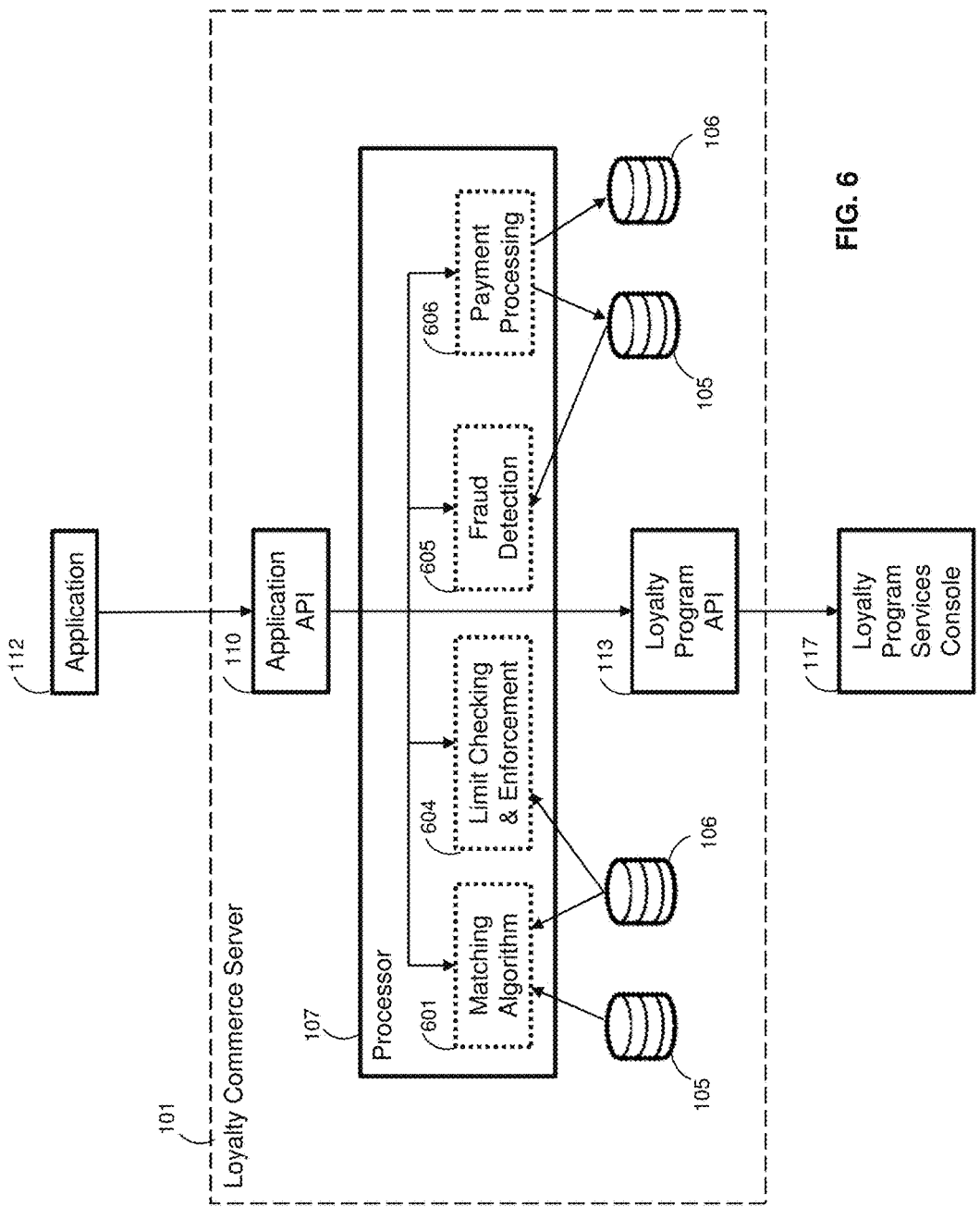
FIG. 6 illustrates the key services for enhancing communication between the loyalty programs and applications.

FIG. 6 is a block-diagram that illustrates the communication between an application 112 and the loyalty program services console 117, highlighting exemplary tasks performed by the processor 107, in accordance with one embodiment. Referring to the top of the diagram, the application 112 sends a command to the application API 110. Next, the API sends a request to the processor 107. The processor 107 is capable of performing matching algorithms, comparing any data sent from application 112 with data stored in databases 105 or 106. The processor 107 performs limit checking, against criteria stored in database 106, and enforcement in order to control the number of requests processed at one time. The processor 107 is capable of performing fraud detection 606, based on transaction history stored in database 105. The processor 107 processes transactions of loyalty points 605, and stores changes in database 105 or 106. The requests are also sent the loyalty program API 113 associated with the appropriate loyalty program services console 117 for interpretation and approval as required.

In one embodiment, the server 101 is configured to receive and process manual pause and review requests. In one aspect, said requests are able to override processor 107 decisions against any transaction occurring on the network 100. This function is provided to administrators via the management services console 115.

Additional security measures include for example, but are not limited to: network user password credentials, and other user identification tools, such as secure socket layer (SSL) certificates, which are integrated into application requests to demonstrate application credibility. If possible, more SSL certificates may be used by Loyalty Programs responding to routing requests.

In an example situation, the processor 107 authenticates the applications 112 by evaluation of the configured authentication scheme of the application (for example SSL client-side certificates) 601. The processor checks requests-per-minute thresholds are not exceeded 604, and assist in performing loyalty member validation for the application 112. The processor identifies the loyalty program to which to route the request, and validates data to be sent to the loyalty program 604, and executes the routing process 606. The processor 107 also returns responses or handles exception cases, such as "timing out" errors among others. Upon successful communication, a message is sent to the console (e.g. GUI or CLI) of the appropriate network users.

Figure 7:
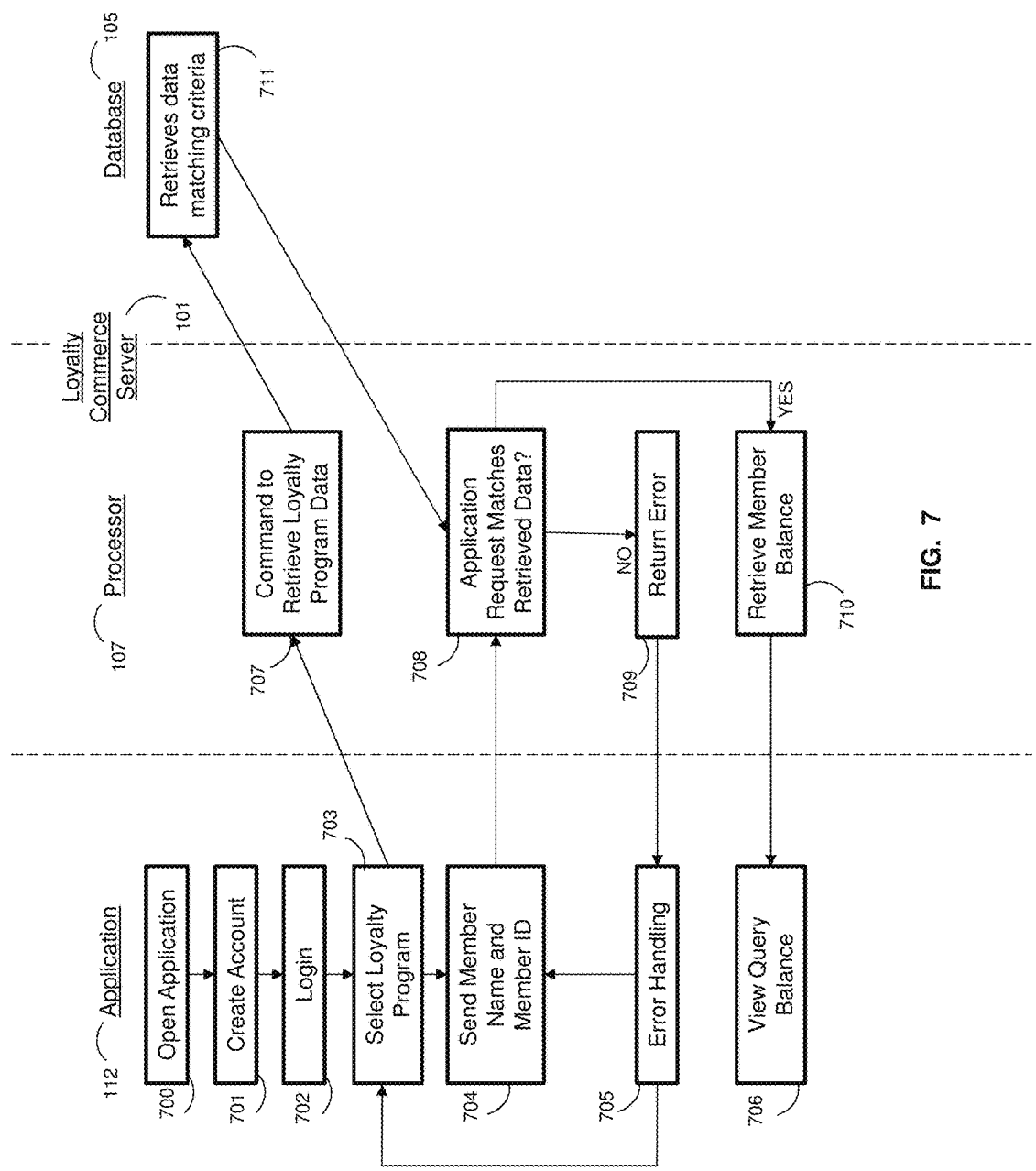
FIG. 7 depicts a module for an application to retrieve loyalty program member data.

FIG. 7 illustrates an exemplary workflow for automatic loyalty member validation, which occurs between an application 112 and loyalty program member database 105, in accordance with one embodiment. First, the application 112 opens at block 700 and the application prompts a loyalty member to create an account 701. Subsequently, the application GUI prompts for loyalty member login credentials 702. The application 112 then presents a list of loyalty programs that have given the application access to loyalty member data (stored in database 105). A loyalty program is selected to perform a transaction 703. A command is sent to the processor to retrieve relevant data 707. The database 105 is then queried for the appropriate data 711. Meanwhile, the application sends loyalty member name and member ID to the processor 107 in step 704. The data returned in step 711 is searched for member names and IDs corresponding to data in the application request 704 in step 708. If a data match is not found, the processor 107 responds to the request with an error code 709. In this example, error handling is included in the application, and the GUI prompts a loyalty member to adjust the request 705. If the search is successful and a match is found, the loyalty balance is retrieved 710 and the application's GUI is configured to display the balance 706.

Figure 8:
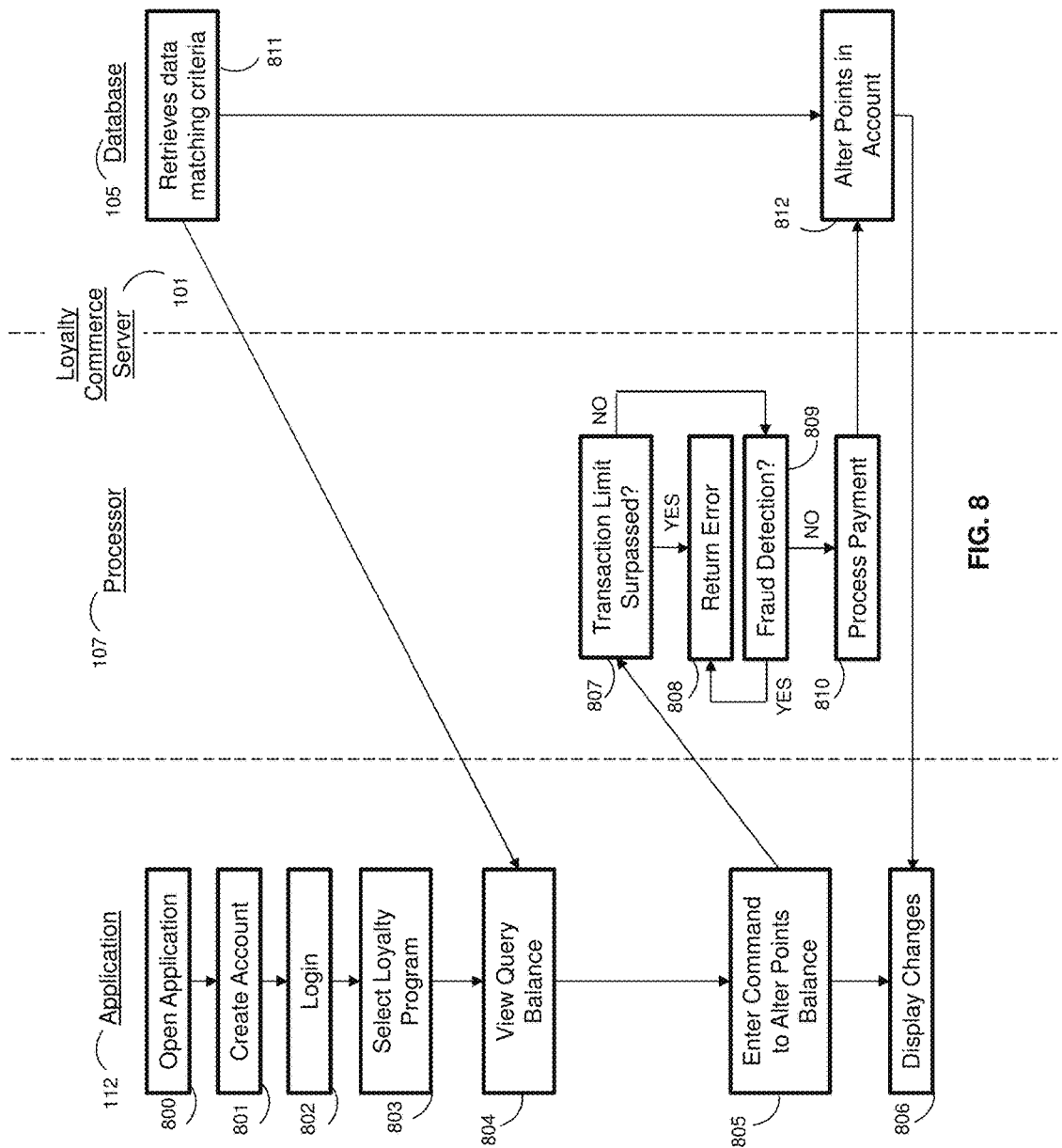
FIG. 8 depicts a module for an application to alter loyalty program member data.

FIG. 8 shows an exemplary workflow diagram for automatically sending requests from an application 112 to the loyalty program member database 105, in accordance with one embodiment. First, the application 112 is opened at block 800, and the GUI is configured to display a form for creating an account 801. Subsequently, the application GUI prompts for loyalty member login credentials 802. The application 112 then presents a list of loyalty programs; the appropriate loyalty program is selected perform a transaction 803. Member validation is not required in this instance; relevant data is pulled from the database 811. The application GUI displays the results 804.

The loyalty balance can then be altered by adding, removing, or transferring loyalty points 805. For example, the application can request to perform a loyalty payment (credit the account), and the command is sent to the processor 107. At block 807, a limit check 604 is performed by the processor 107 to ensure that the number of transactions in process does not exceed server limits. If the limit is currently reached, for example, the processor returns an error or delays the transaction 808. Else, the processor continues to analyze the transaction request for indicators of fraudulent behaviour 809. If the results show the request is fraudulent, the processor returns an error 808, for example. If fraud detection results are negative, the processor will process the payment request 606 at block 810. The processor accesses the points account and alters the balance accordingly at block 812. Afterwards, the application GUI displays the changes to the balance 806.

Figure 9:
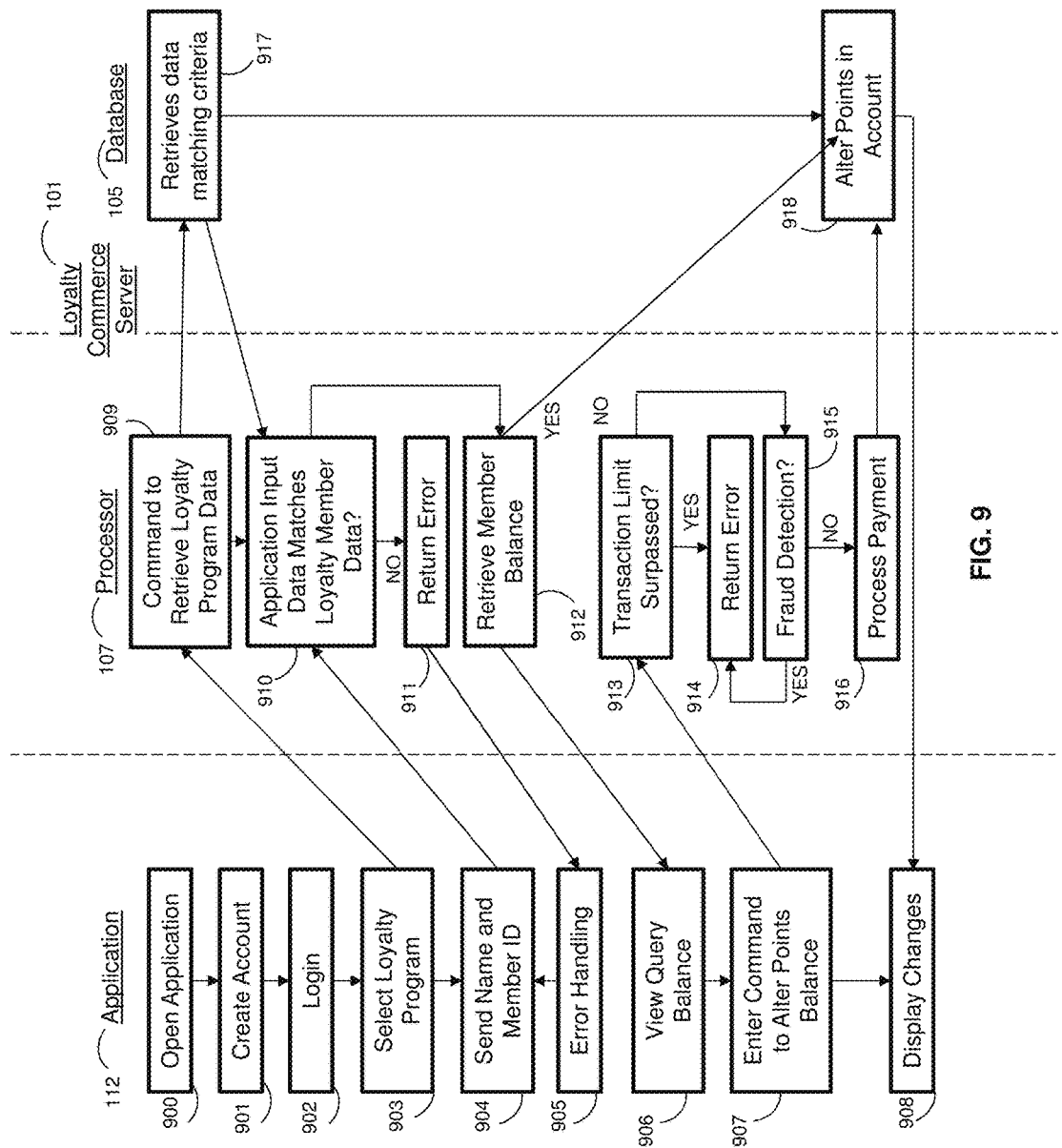
FIG. 9 depicts a combined process for an application to retrieve and alter loyalty member data.

FIG. 9 shows the combined exemplary workflows from FIG. 7 and FIG. 8 for communicating between applications and the corresponding loyalty programs, in accordance with one embodiment. Referring to FIG. 9, it illustrates an automatic workflow for member validation and sending requests from an application 112 and the loyalty program member database 105. First, the application 112 is opened at block 900, and the GUI displays a form for creating an account 901. Subsequently, the application GUI prompts for loyalty member login credentials 902. The application 112 then presents a list of loyalty programs; the appropriate loyalty program is selected perform a transaction 903. The processor sends a command to retrieve the relevant data 907. Next, the name and member ID specific to the loyalty member is sent to the processor 904 for comparison against existing membership data 910. If a match is not found, an error is returned 911. In an example situation, the application then re-prompts the user for information 905 as necessary. If the check is successful and a match is found, the loyalty balance is retrieved 912 and the application GUI displays the results 906.

The loyalty balance can then be altered by adding, removing, or transferring loyalty points 907. For example, the application can request to perform a loyalty payment (credit the account), and the command is sent to the processor 107. At block 913, a limit check 604 is performed by the processor 107 to ensure that the number of transactions in process does not exceed server limits. If the limit is currently reached, the processor returns an error or delays the transaction, for example, in step 914. Else, the processor continues to analyze the transaction request for indicators of fraudulent behaviour 915. If the results show the request is fraudulent, the processor returns an error 914. If fraud detection results are negative, the processor will process the payment request 606 at block 916. The processor accesses the points account and alters the balance accordingly at block 918. Afterwards, the application GUI displays the changes 908.

In one aspect, loyalty balance changes are also made automatically such that reoccurring transactions are automated by the loyalty member. In an example embodiment, the application performs a transaction with pre-set criteria, and repeats said transaction based on a set timer. The modules executed by the processor and database would remain consistent. It is also possible for the loyalty program to make changes to the loyalty member data in database 105 through use of the loyalty program API 113 that communicates the processor 107.

Figure 10:
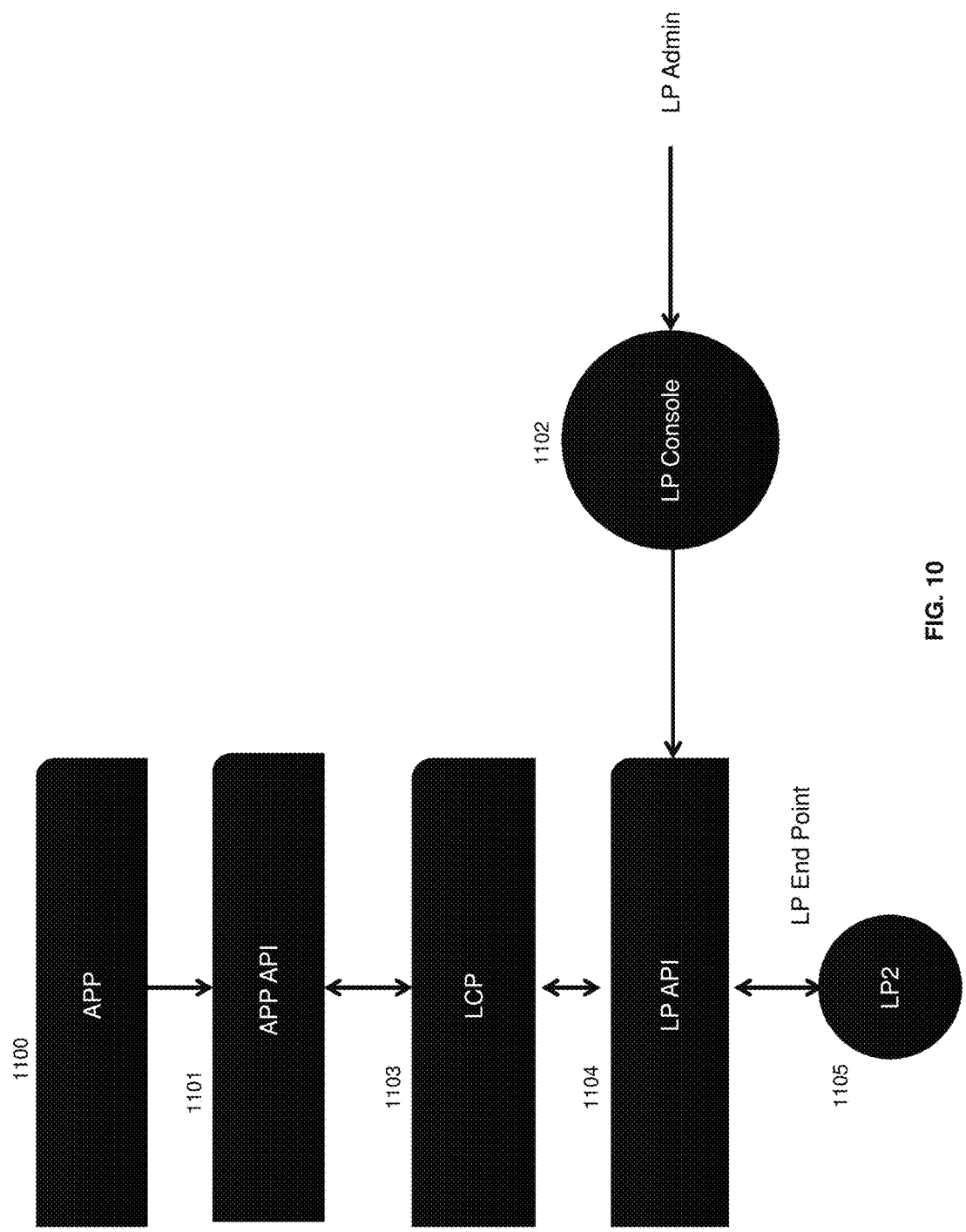
FIG. 10 depicts a schematic showing exemplary components of the loyalty commerce network interacting with one another, in accordance with an embodiment.

FIG. 10 displays exemplary communication between components of the loyalty commerce network 100, in accordance with an embodiment. Referring to FIG. 10, an application 1100 communicates via API 1101 to the LCP (loyalty commerce platform) 1103 also referred to herein as the loyalty commerce server (e.g. see FIG. 1A). The loyalty commerce platform 1103 further communicates with a loyalty program API (LP API) shown as 1104. In turn, a loyalty program 1105 communicates with the loyalty commerce platform 1103 via a loyalty program API 1104. In addition, a loyalty program administrator accesses the loyalty program API 1104 via a loyalty program console 1102. The following are exemplary functionalities of the components in FIG. 10, the application (APP) 1100 is configured to perform loyalty transactions on the loyalty commerce platform (LCP) 1103. Exemplary transactions include: member validations, debit, credit and payment. The application 1100 is further configured to provide user transaction loyalty points. The application interface 1101 (APP API) is a programming interface for the applications 1100 to interact with the LCP (Loyalty Commerce Platform) 1103. The loyalty commerce platform (LCP) 1103 is a collection of computer implemented services and API's that enable applications and loyalty programs to communicate using the common interface. The Loyalty Program API (LP API) 1104 is a programming interface for the loyalty programs (e.g. LP2 1105) to interact with the LCP (Loyalty Commerce Platform) 1103. A loyalty platform console (LP Console)

1102 is an interface for a user (e.g. administrator) to manage their integration and performance of the application.

Figure 11:
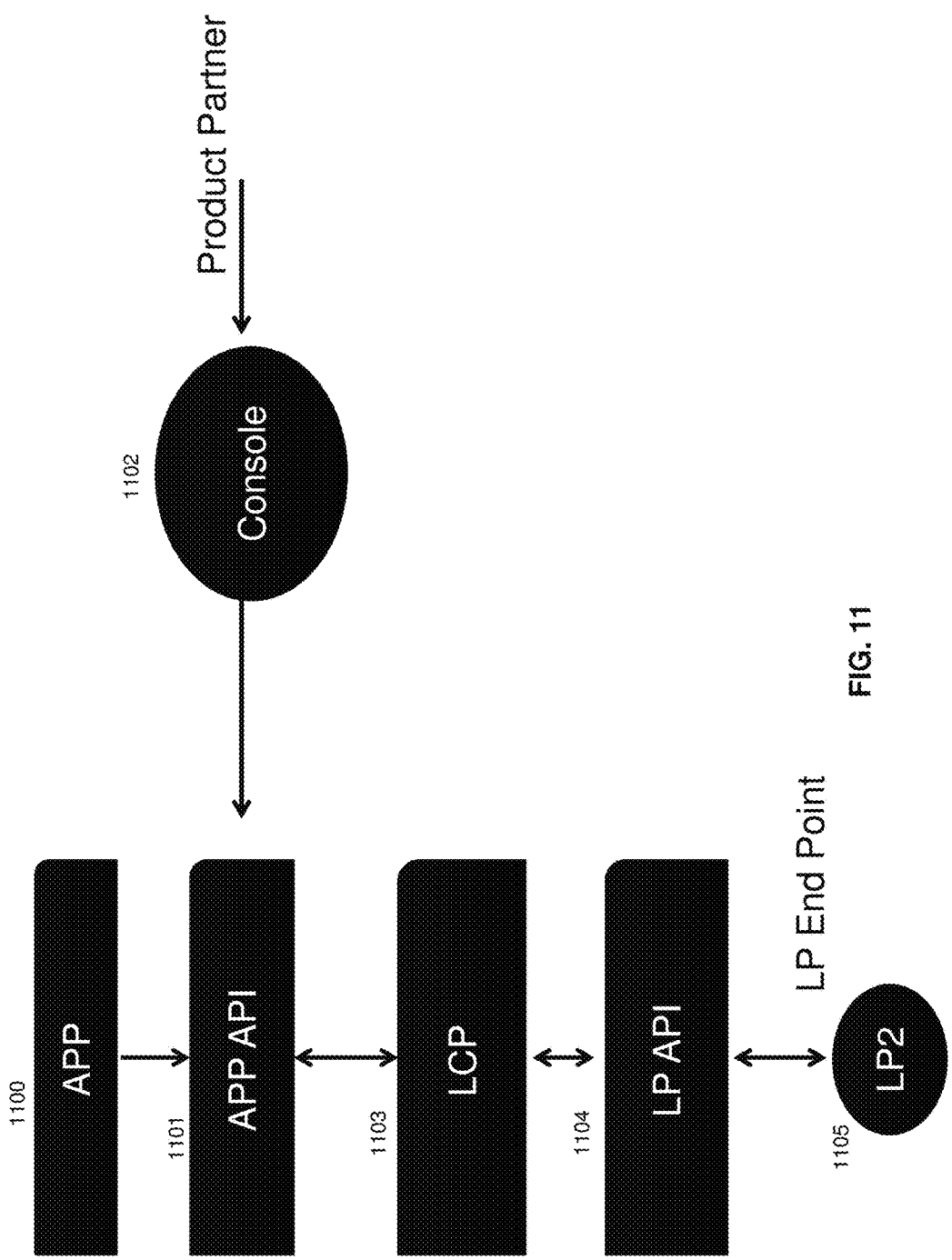
FIG. 11 depicts a schematic showing exemplary components of the loyalty commerce network interacting with one another, in accordance with an embodiment.

FIG. 11 displays exemplary interaction and components of a loyalty commerce network (e.g. as exemplified in FIG. 1A) and further to the embodiment of FIG. 10, in accordance with one embodiment. Referring to FIG. 11, the applications (both internal & external) are built using the application API (APP API) 1101. The application API (APP API) 1101 is configured to provide access to a basic set of primitives (e.g. instructions and/or templates) that can be used to build a broad variety of loyalty applications. In addition to the Application API 1101, product partners also interact (e.g. via respective computing devices) with the network using the product partner console (e.g. console 1102). One purpose of the console 1102 is to allow the product partner to manage their participation in the network. Specifically, the product partner console 1102 enables management of credentials, application submission to the app store and access to reports registered applications and access reports.

The following is an exemplary flow of interaction between the components of FIG. 11. A product partner console 1102 connects to the loyalty commerce platform (LCP 1103) via APIs (e.g. 1101). The product partner console 1102 can provide the following exemplary input into the platform: personal details such as email; password, name, organization and phone number; names and descriptions of applications they wish to make available on the LCP 1103; data to request adding or removing points from an individual member's account; application endpoints which will receive information from the LCP 1103; requests for live mode access to specific LPs (loyalty programs and their corresponding application APP 1100).

Referring again to FIG. 11, once a product partner has connected with the platform, via the product partner console 1102 they will be able to do the following exemplary operations: manage their credentials (for e.g. password changes) and the ability to administer which individuals from their organization access rights to the LCP 1103; browse the list of LPs that are available on LCP 1103, look up the meta data schemas; access a dashboard to get an "at a glance" view of how their applications 1100 are performing (revenue year to date, growth vs last year, marketing campaign performance vs actuals). The operations and communications described with respect to FIGS. 10 and 11 are exemplary.

Figure 16:
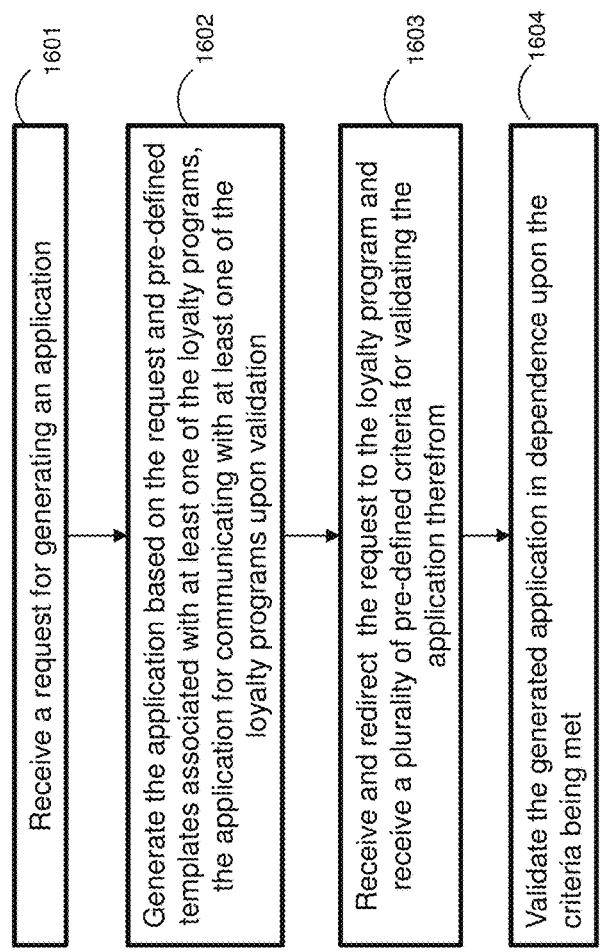
FIG. 16 depicts a computer-implemented process for facilitating generation of an application for communicating with loyalty programs.

FIG. 16 provides example computer executable instructions for facilitating generation of an application for communicating with loyalty programs. The instructions for the computer implemented method includes receiving a request for generating the application (block 1601); generating the application based on the request and pre-defined templates associated with at least one of the loyalty programs, the application for communicating with at least one the loyalty program upon validation (block 1602); receiving and redirecting the request to the loyalty program and receiving a plurality of pre-defined criteria for validating the application therefrom (1603); and, validating the generated application in dependence upon the criteria being met (1604).

Figure 12:
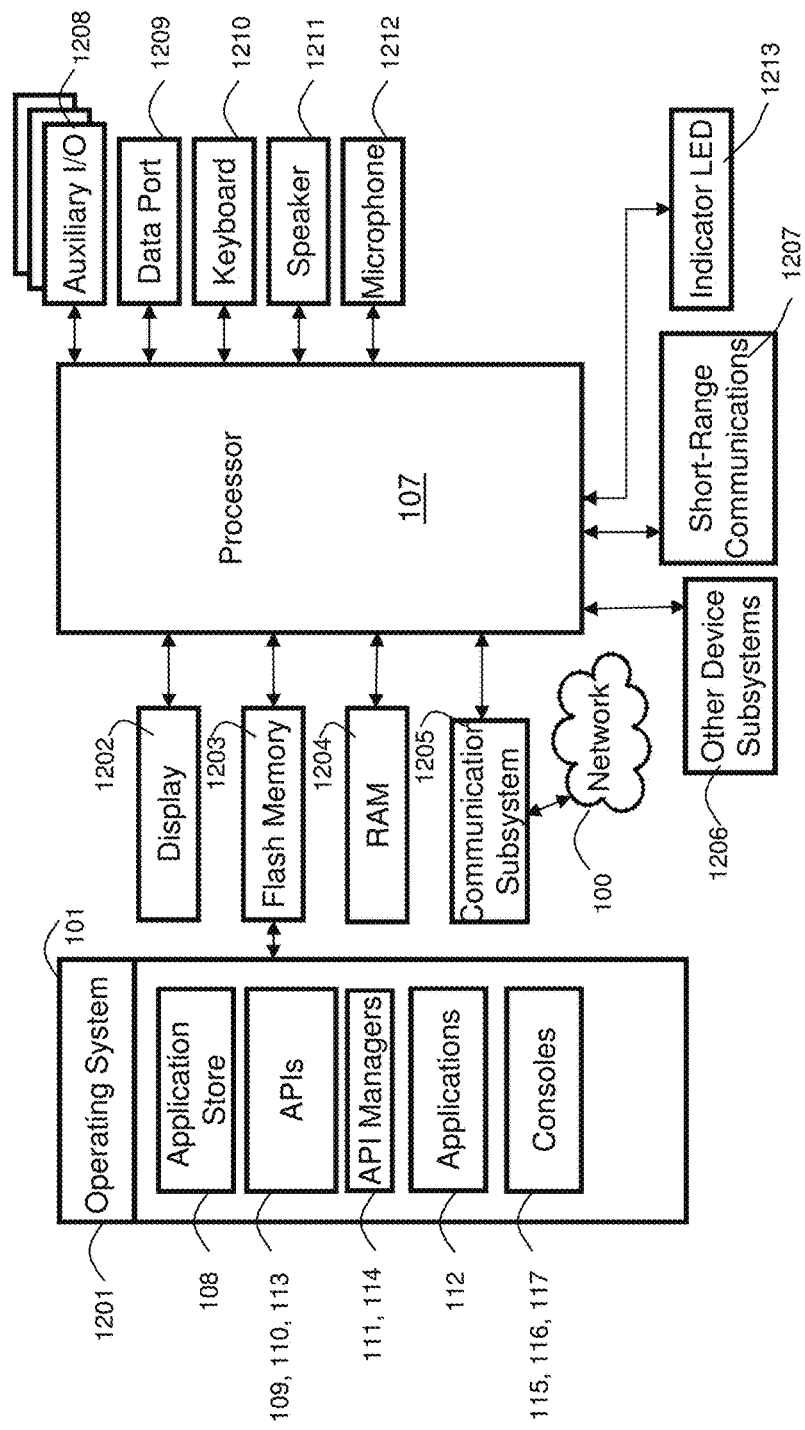
FIG. 12 illustrates components of the server of FIG. 1A.

FIG. 12 shows one embodiment of an example configuration and components for server 101. The server 101 includes a plurality of components such as a processor 107 that controls the overall operation of the server 101. Communication functions, including data transactions and routing requests, are performed through a communication subsystem 1205. The communication subsystem 1205 receives messages from and sends messages to a wireless network 100.

The processor 107 also interacts with additional subsystems such as a Random Access Memory (RAM) 1204, a flash memory 1203, a display 1202, an auxiliary input/output (I/O) subsystem 1208, a data port 1209, a keyboard 1210, a speaker 1211, a microphone 1212, an indicator light emitting diode (LED) 1213, and other device subsystems 1206. As will be discussed, the short-range communications 1207 can implement any suitable or useful device-to-device or peer-to-peer communications protocol capable of communicating at a relatively short range, e.g. directly from one device to another. Examples include Bluetooth®, WiFi, infrared, or any "long-range" protocol re-configured to utilize available short-range components. It will therefore be appreciated that short-range communications 1207 may represent any hardware, software or combination of both that enable a communication protocol to be implemented between devices or entities in a short range scenario, such protocol being standard or proprietary.

Some of the subsystems of the server 101 perform communication-related functions, whereas other subsystems may provide "resident" or on-device functions. By way of example, the display 1202 and the keyboard 1210 may be used for both communication-related functions, such as entering messages for transmission over the network 100, and device-resident functions such as a calculator or task list.

The server 101 can send and receive communication signals over the wireless network 100 after required network registration or activation procedures have been completed. Network access is associated with a user of the server 100.

The server 101 also includes an operating system 134 and software and/or hardware components 108 to 117, from FIG. 1A. The operating system 1201 and the components that are executed by the main processor 102 are typically stored in a persistent store such as the flash memory 108, which may alternatively be a read-only memory (ROM) or similar storage element (not shown). Those skilled in the art will appreciate that parts of the operating system 1201 and the software components, or parts thereof, may be temporarily loaded into a volatile store such as the RAM 1206. Other software components can also be included, as is well known to those skilled in the art.

Other types of software applications or components can also be installed on the server 101. These software applications can be pre-installed applications or third party applications. Examples of third party applications include games, calculators, utilities, etc. The additional applications can be loaded onto the server 101 through at least one of the wireless network 100, the auxiliary I/O subsystem 1208, the data port 1209, the short-range communications subsystem 1207, or any other suitable device subsystem 1206.

The data port 1209 can be any suitable port that enables data communication between the mobile device 10 and another computing device. The data port 1209 can be a serial or a parallel port.

For voice communications, received signals are output to the speaker 1211, and signals for transmission are generated by the microphone 1212. Although signal output is accomplished primarily through the display 1202, the speaker 1211 can also be used to provide additional information such as the identity of a calling party, duration of a voice call, or other voice call related information.

For composing data items, such as e-mail messages, for example, a user or subscriber could use a touch-sensitive overlay (not shown) on the display 1202 that is part of a touch screen display (not shown), in addition to possibly the auxiliary I/O subsystem 1208. The auxiliary I/O subsystem 1208 may include devices such as: a mouse, track ball, infrared fingerprint detector, or a roller wheel with dynamic button pressing capability.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A computer-implemented loyalty commerce network system for facilitating generation of an application via an application computing device for communicating with loyalty programs via corresponding loyalty program computing devices, the system comprising:
   an application programming interface coupled to the application computing device via a centralized platform, for receiving a request for generating said application and for generating said application based on said request, said application when generated via said application programming interface enabling said application to be configured to work with each of a plurality of loyalty programs upon validation;
   at least one pre-defined template stored by the centralized platform and providing pre-implemented functionality to increase efficiency of application development and to increase reliability of the application being developed, by providing: i) graphical appearance or design of interfaces for individual loyalty programs, ii) at least one pre-developed and pre-tested feature, and iii) pre-defined rights for users of the loyalty programs;
   a loyalty program interface configured for communicating between the loyalty commerce network system and said at least one loyalty program, said loyalty program interface for receiving and redirecting said request to said loyalty program, said loyalty program interface for defining a plurality of pre-defined criteria for validating said application; and,
   a loyalty server processor for:
      processing said request from said application computing device via said application programming interface for generating said application using a selected one of said at least one pre-defined template associated with at least one of said loyalty programs,
      communicating with said loyalty program interface for determining said pre-defined criteria and for validating said application in dependence upon said criteria being met;
      once validated, said application performing at least one of member validation, account balance inquiry and access reports associated with a particular loyalty program of said loyalty programs; and
      enabling said plurality of loyalty programs to deploy the application for their respective loyalty program.

2. The system of claim 1, wherein the application programming interface further comprises at least one of: a graphical user interface and a command line interface for receiving input and modifying said pre-defined templates in response thereto.

3. The system of claim 1, wherein the loyalty program interface further comprises at least one of: a graphical user interface and a command line interface for receiving input and modifying said pre-defined criteria in response thereto.

4. The system of claim 1, wherein the at least one pre-defined template defines a set of computer-executable instructions for generating said application, said instructions being updated according to feedback from said loyalty program computing devices in response to patterns indicated from previously generated applications associated with a particular loyalty program.

5. The system of claim 1, wherein the generated application is published to at least one webpage for access and further modification by the corresponding loyalty program computing devices, the applications configured for accessing the network data and performing loyalty based transactions in association with said at least one loyalty program.

6. The system of claim 1, wherein the loyalty program interface is accessed by the loyalty program computing device to further validate said application in addition to said pre-defined criteria.

7. The system of claim 1, wherein the loyalty program interface provide pre-defined loyalty information associated with a particular loyalty program for populating said pre-defined templates and accessible via the application interface for requesting generation of said the application.

8. The system of claim 1, wherein the pre-defined templates provide at least one of the following data: visual attributes defined for a corresponding application associated with a particular loyalty program, pre-defined rights for users of corresponding loyalty programs in interacting with the application.

9. The system of claim 8, wherein said rights are selected from the group consisting of: querying balance, updating member profile information, debiting or crediting loyalty member accounts, and trading loyalty rewards between loyalty programs.

10. The system of claim 1, wherein each of said interfaces is defined using representational state transfer style (REST or RESTful) web services components.

11. The system of claim 1, wherein the pre-defined criteria is dynamically updated based on previously validated applications associated with a particular loyalty program.

12. The system of claim 1, wherein the processor is further configured for utilizing loyalty-based information passed between the loyalty program computing devices and the processor to determine at least one of: loyalty program trends and target loyalty members for modifying behavior of subsequent applications being generated.

13. A non-transitory computer program product, comprising computer executable instructions that when executed by a computer are configured to generate an application for communicating with loyalty programs, said instructions configured for:
   storing at a centralized platform, at least one pre-defined template providing pre-implemented functionality to increase efficiency of application development and to increase reliability of the application being developed, by providing: i) graphical appearance or design of interfaces for individual loyalty programs, ii) at least one pre-developed and pre-tested feature, and iii) pre-defined rights for users of the loyalty programs;
   receiving, at said centralized platform via an application programming interface, a request for generating said application from an application developer computing device coupled to the application programming interface;
   generating, at said centralized platform, said application based on said request and a selected one of the at least one pre-defined template associated with at least one of said loyalty programs, said application when generated via said application programming interface, enabling said application to be configured to work with each of a plurality of loyalty programs upon validation;

receiving, at said centralized platform, and redirecting said request to said loyalty program, and receiving a plurality of pre-defined criteria for validating said generated application therefrom;

validating said generated application according to said pre-defined criteria;

once validated, said application performing at least one of member validation, account balance inquiry and access reports associated with a particular loyalty program of said loyalty programs;

enabling said plurality of loyalty programs to deploy the application for their respective loyalty program.

14. A method of generating an application for communicating with loyalty programs, said method comprising:

storing at a centralized platform, at least one pre-defined template providing pre-implemented functionality to increase efficiency of application development and to increase reliability of the application being developed, by providing: i) graphical appearance or design of interfaces for individual loyalty programs, ii) at least one pre-developed and pre-tested feature, and iii) pre-defined rights for users of the loyalty programs;

receiving, at said centralized platform via an application programming interface, a request for generating said application from an application developer computing device coupled to the application programming interface;

generating, at said centralized platform, said application based on said request and a selected one of the at least one pre-defined template associated with at least one of said loyalty programs, said application when generated via said application programming interface, enabling said application to be configured to work with each of a plurality of loyalty programs upon validation;

receiving, at said centralized platform, and redirecting said request to said loyalty program, and receiving a plurality of pre-defined criteria for validating said generated application therefrom;

validating said generated application according to said pre-defined criteria;

once validated, said application performing at least one of member validation, account balance inquiry and access reports associated with a particular loyalty program of said loyalty programs;

enabling said plurality of loyalty programs to deploy the application for their respective loyalty program.

15. The method of claim 14 wherein the application programming interface further comprises at least one of a graphical user interface (GUI) and a command line interface, and the method further comprises receiving input and modifying said pre-defined templates in response thereto, via at least one of said GUI and said command_line interface.

16. The method of claim 14 wherein the at least one pre-defined template defines a set of computer-executable instructions for generating said application, and the method further comprises updating said instructions according to feedback from loyalty program computing devices in response to patterns indicated from previously generated applications associated with a particular loyalty program.

17. The system of claim 1, wherein the loyalty server processor is further configured for:

initiating a developer mode for the application developer computing device and providing one or more development tools and pre-defined templates associated with at least one of said loyalty programs, said application for communicating with at least one said loyalty program upon approval;

during said developer mode, simulating changes to loyalty member data to be used by said application rather than storing changes in a database storing said loyalty member data;

receiving a submitted application generated in said developer mode;

receiving from said loyalty program, a plurality of pre-defined criteria for approving or declining said generated application;

reviewing said generated application according to said criteria;

when said generated application is approved, creating a live application from said generated application, making said live application accessible to said loyalty programs via an application store, and granting permission to said live application to manipulate said loyalty member data; and when said generated application is declined, reinitiating said developer mode for the application developer computing device to edit and further simulate said application prior to resubmission of same.

18. The method of claim 14, further comprising:

initiating a developer mode for the application developer computing device and providing one or more development tools and pre-defined templates associated with at least one of said loyalty programs, said application for communicating with at least one said loyalty program upon approval;

during said developer mode, simulating changes to loyalty member data to be used by said application rather than storing changes in a database storing said loyalty member data;

receiving a submitted application generated in said developer mode;

receiving from said loyalty program, a plurality of pre-defined criteria for approving or declining said generated application;

reviewing said generated application according to said criteria;

when said generated application is approved, creating a live application from said generated application, making said live application accessible to said loyalty programs via an application store, and granting permission to said live application to manipulate said loyalty member data; and when said generated application is declined, reinitiating said developer mode for the application developer computing device to edit and further simulate said application prior to resubmission of same.

* * * * *